United States Patent
Hungerford

(10) Patent No.: US 9,399,422 B2
(45) Date of Patent: *Jul. 26, 2016

(54) SIDE HEADREST WITH CHIN SUPPORT AND CLAMP

(71) Applicant: John Hungerford, Vero Beach, FL (US)

(72) Inventor: John Hungerford, Vero Beach, FL (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/503,867

(22) Filed: Oct. 1, 2014

(65) Prior Publication Data

US 2015/0197168 A1 Jul. 16, 2015

Related U.S. Application Data

(63) Continuation of application No. 14/154,290, filed on Jan. 14, 2014, now Pat. No. 9,079,520.

(51) Int. Cl.
*B60N 2/48* (2006.01)

(52) U.S. Cl.
CPC .............. *B60N 2/487* (2013.01); *B60N 2/4805* (2013.01); *B60N 2/4808* (2013.01); *B60N 2/4838* (2013.01); *B60N 2/4879* (2013.01); *Y10T 29/481* (2015.01); *Y10T 29/49826* (2015.01)

(58) Field of Classification Search
CPC .... B60N 2/4805; B60N 2/4879; A47C 7/383; B64D 11/0642
USPC .......................... 297/392, 397, 399, 400, 402
See application file for complete search history.

(56) References Cited

U.S. PATENT DOCUMENTS

| | | | |
|---|---|---|---|
| 42,084 A | 3/1864 | Hambujer | |
| 104,473 A | 6/1870 | Lyon | |
| 162,784 A | 5/1875 | White | |
| 221,752 A | 11/1879 | Taylor | |
| 344,726 A * | 6/1886 | Dolton | B60N 2/487 297/403 |
| 379,987 A | 3/1888 | Ryan | |
| 426,069 A | 4/1890 | Rogers | |
| 2,555,814 A | 6/1951 | Pulsifer | |
| 5,528,784 A | 6/1996 | Painter | |
| 5,934,754 A * | 8/1999 | Raffa | B60N 2/24 297/220 |
| D444,980 S | 7/2001 | Mowat | |
| 7,393,057 B2 | 7/2008 | Fraser | |
| 8,033,603 B2 | 10/2011 | Meert | |
| 8,888,187 B2 * | 11/2014 | Albino | B60N 2/4882 297/392 |
| 9,079,520 B1 * | 7/2015 | Hungerford | B60N 2/4879 |
| 2003/0038520 A1 * | 2/2003 | Marbutt | B60N 2/2839 297/392 |
| 2006/0250015 A1 | 11/2006 | Buck | |
| 2008/0048479 A1 * | 2/2008 | Yoshida | H01R 13/627 297/410 |
| 2010/0213748 A1 * | 8/2010 | Pedrero Iniguez | B60N 2/482 297/410 |
| 2010/0237677 A1 * | 9/2010 | Nam | A47C 7/38 297/410 |

* cited by examiner

*Primary Examiner* — Jose V Chen
(74) *Attorney, Agent, or Firm* — Brian S. Steinberger; Law Offices of Brian S. Steinberger, P.A.

(57) ABSTRACT

Apparatus, devices, systems, and methods for clamping a length adjustable hook on a portable headrest with chin support to a top or side of a seat back, which is both adjustable and foldable to be portable for ease in transport. The horizontal chin rest pivotally attached to the bottom of a vertical member allows a sitting person's head to be supported in an upright position, while restricting movement both forward and side to side. The headrest can have telescoping vertical members which are length adjustable for different sized users. The chin support can have a cushion that is rotatable at different increments for comfort. The cushion can be slotted to allow the vertical member to be placed inside the slotted portion.

20 Claims, 34 Drawing Sheets

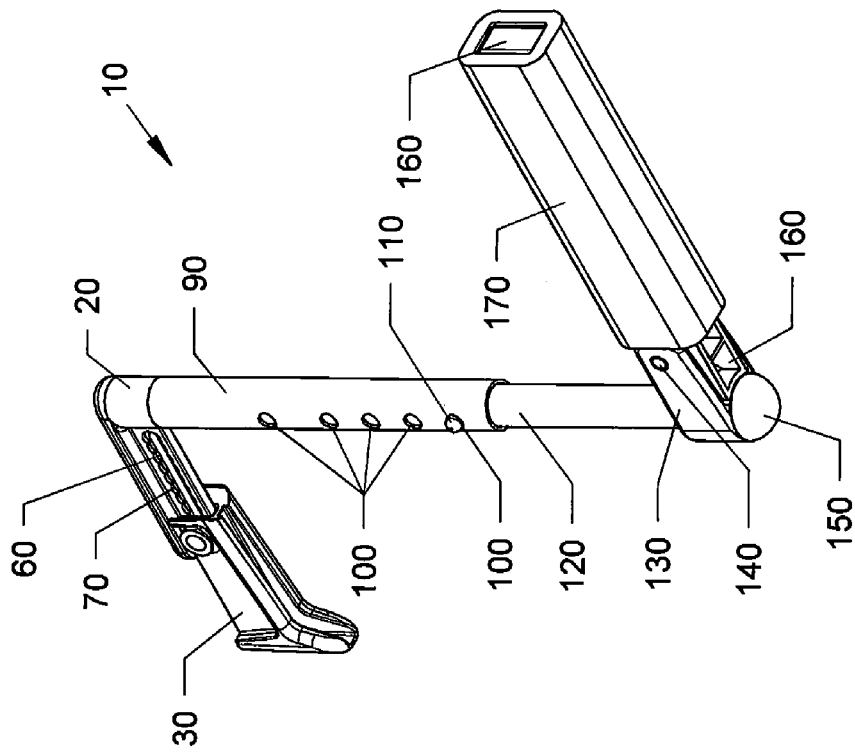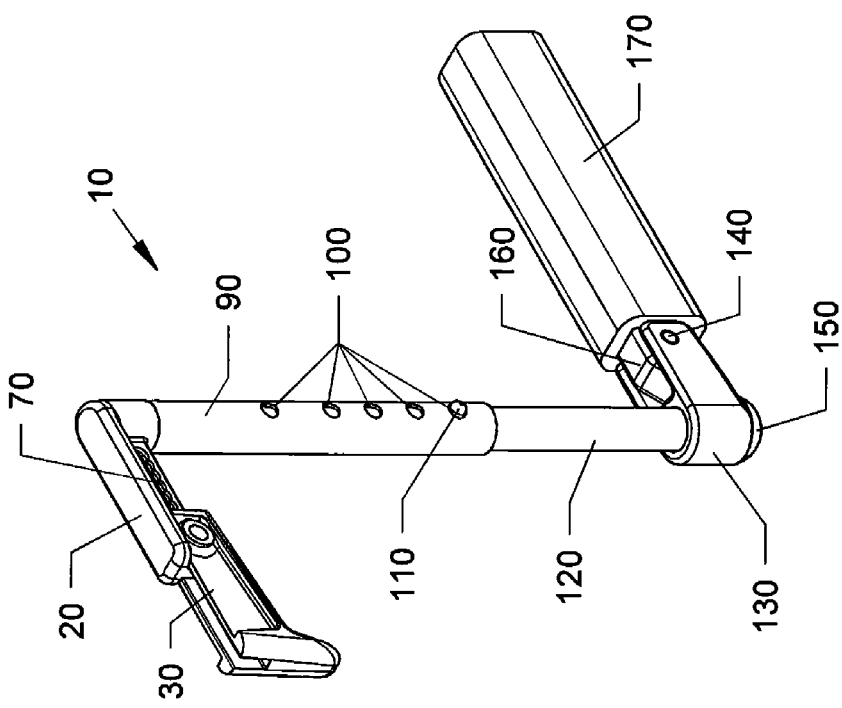

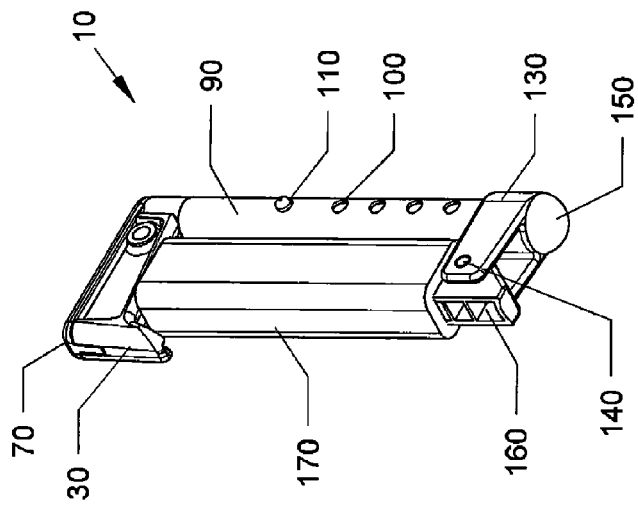
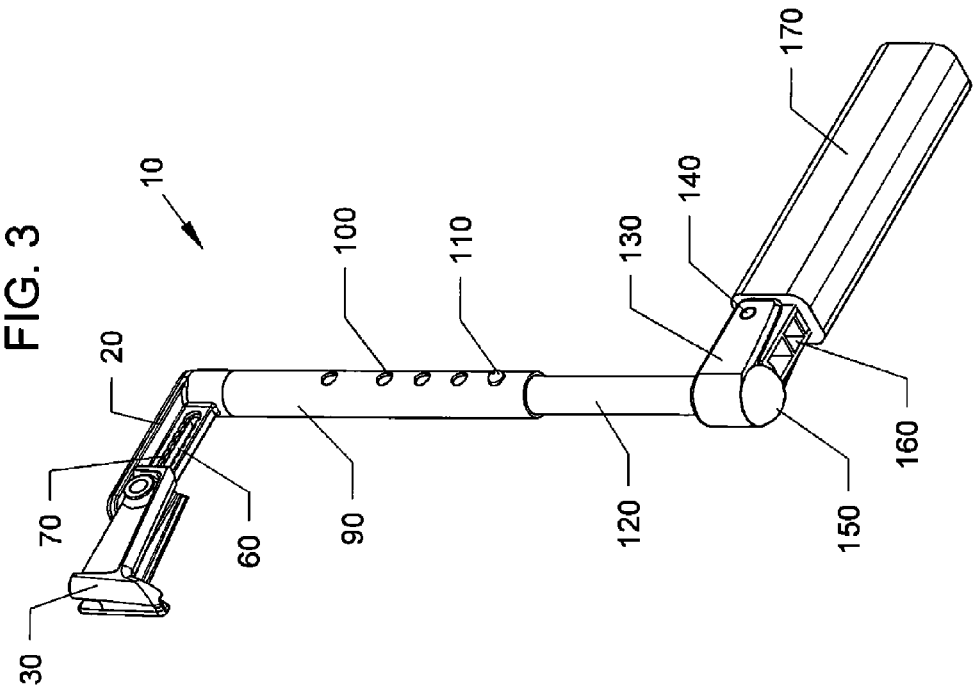

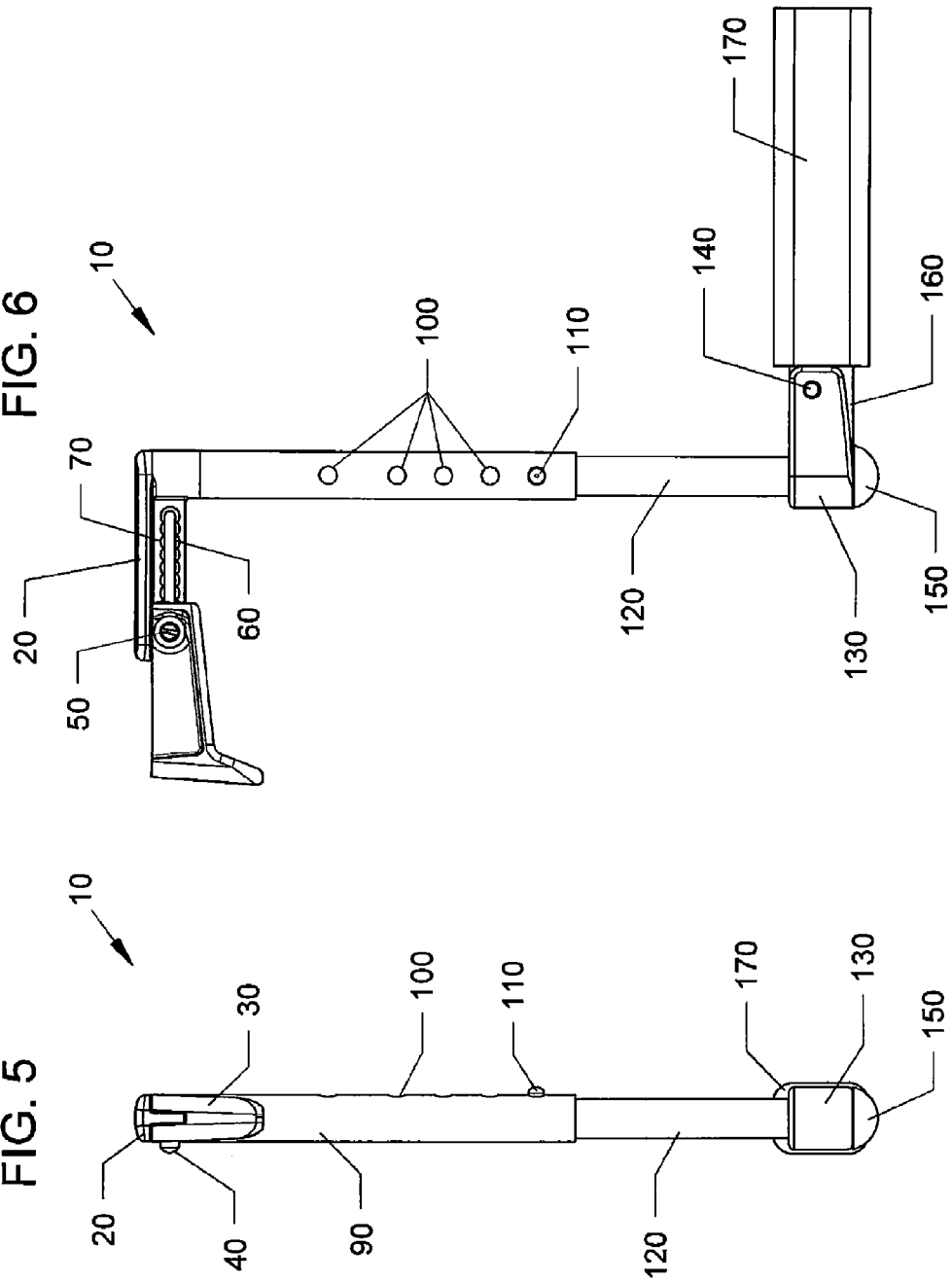

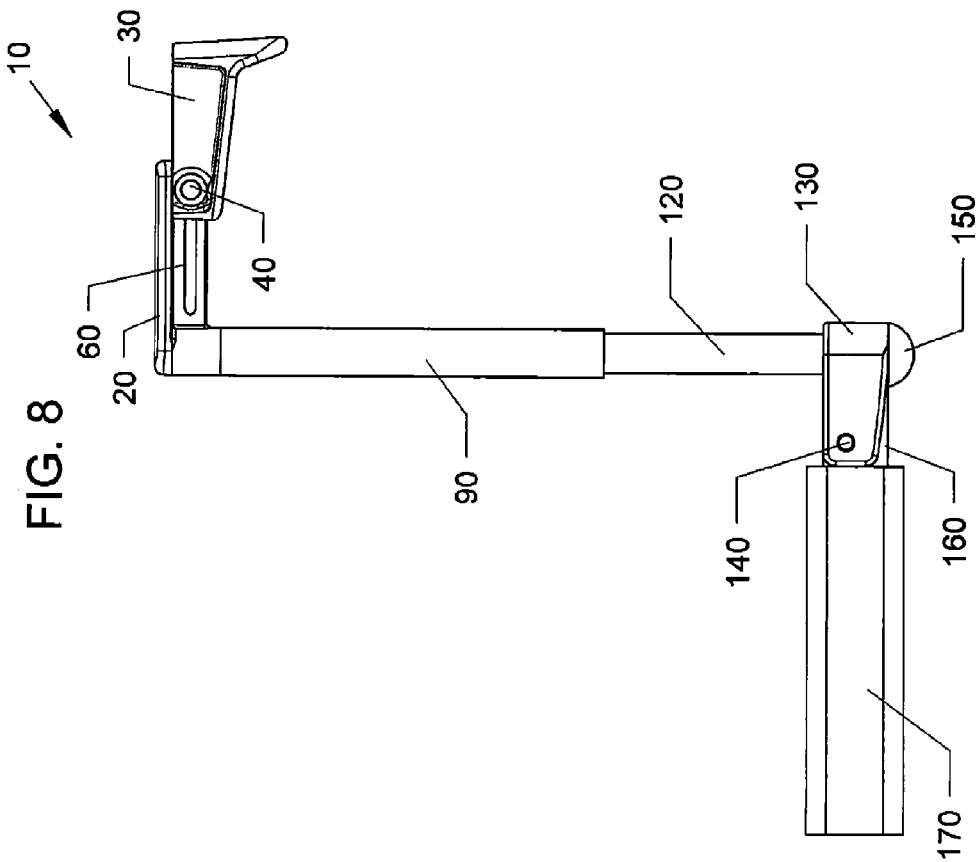
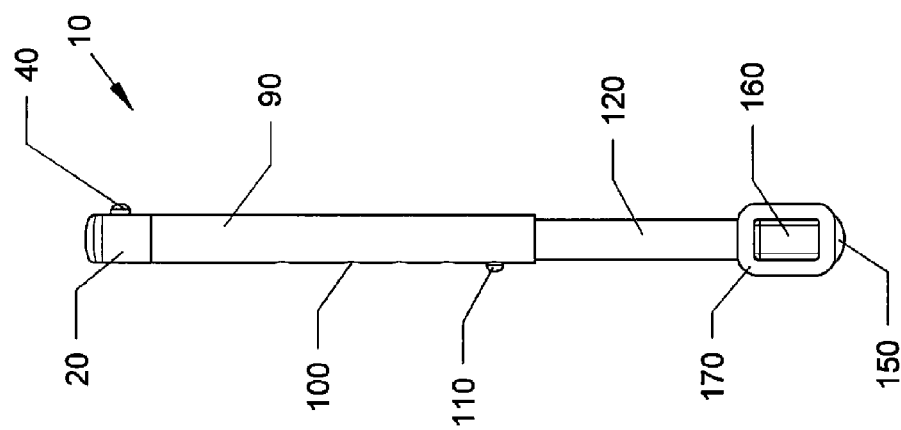

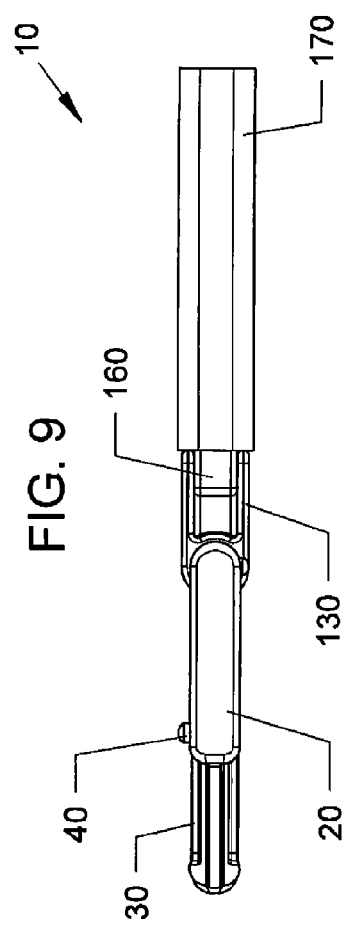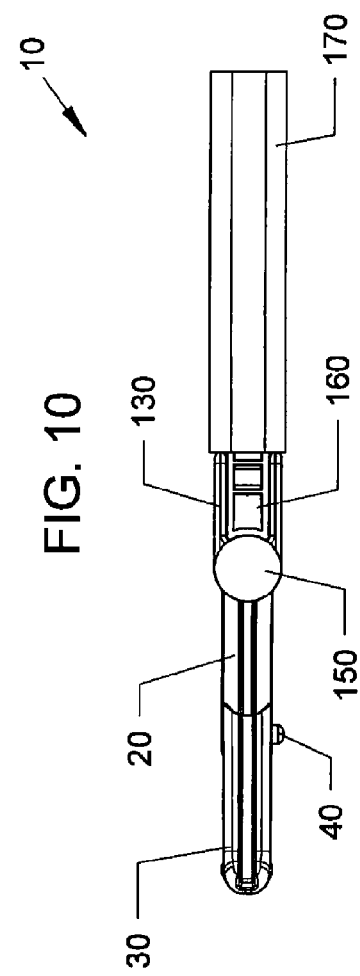

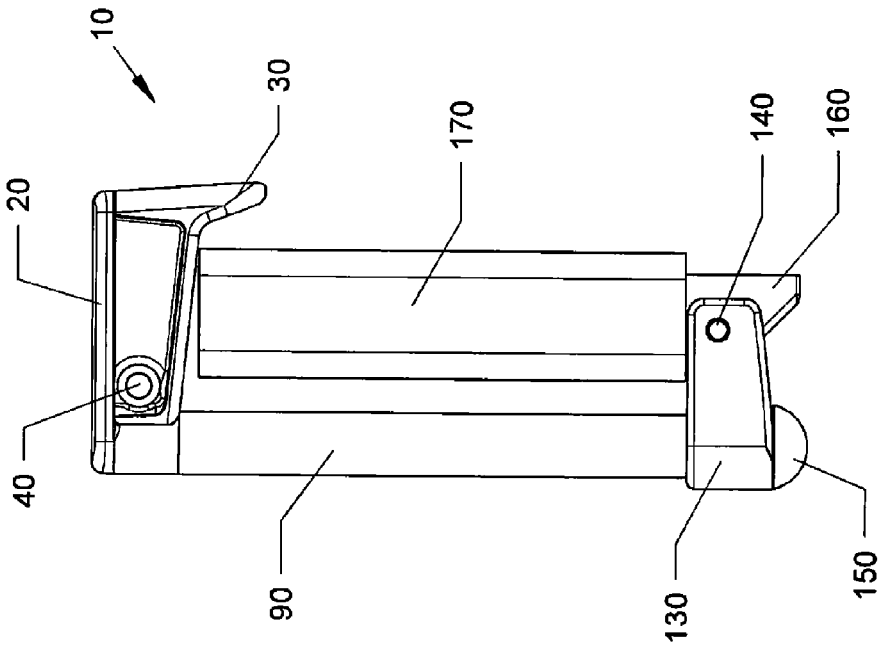
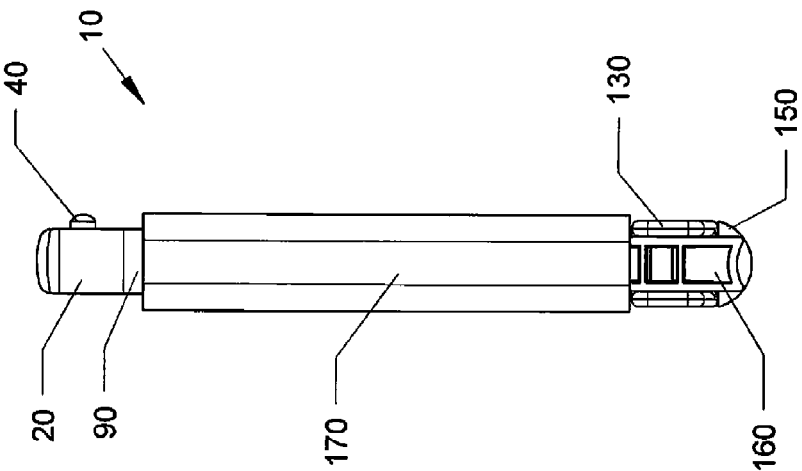

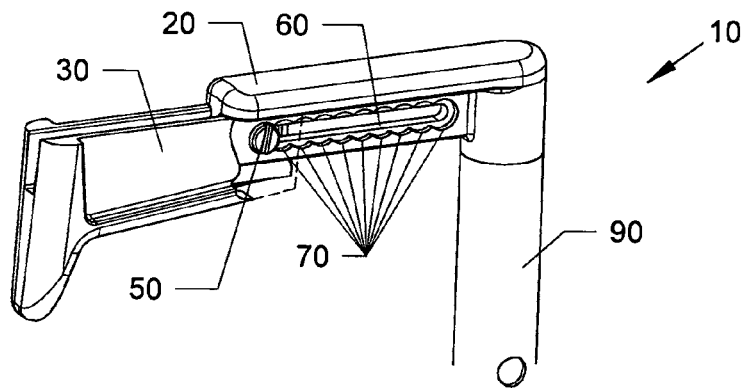
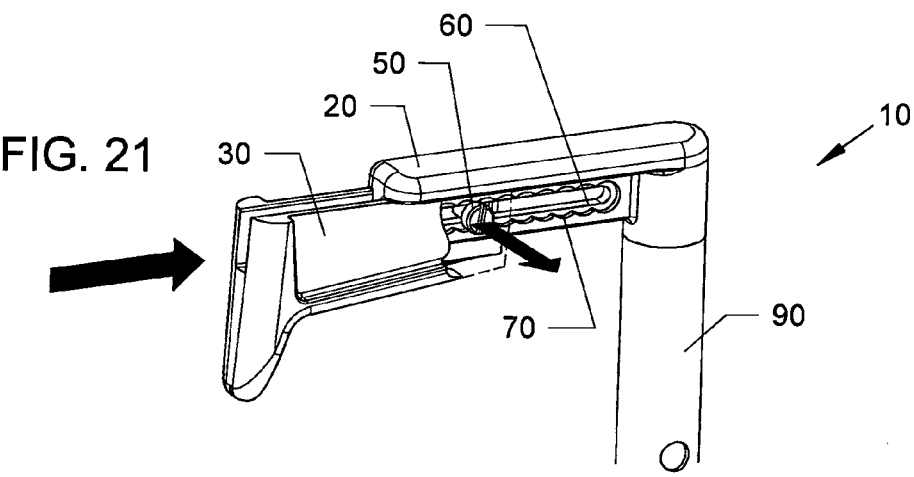
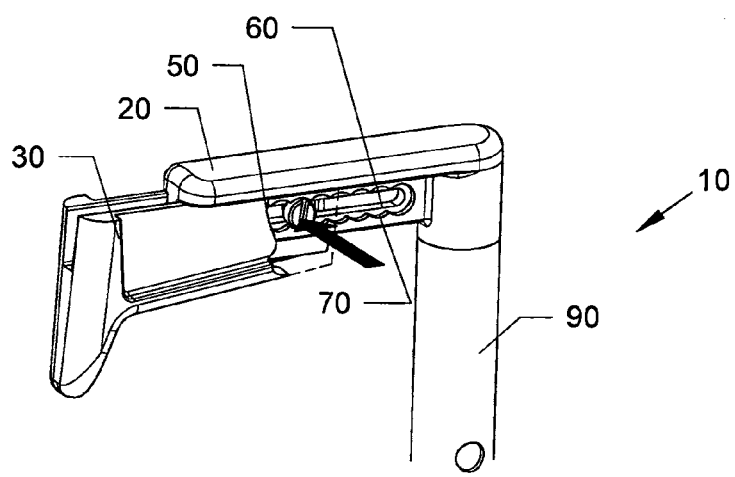

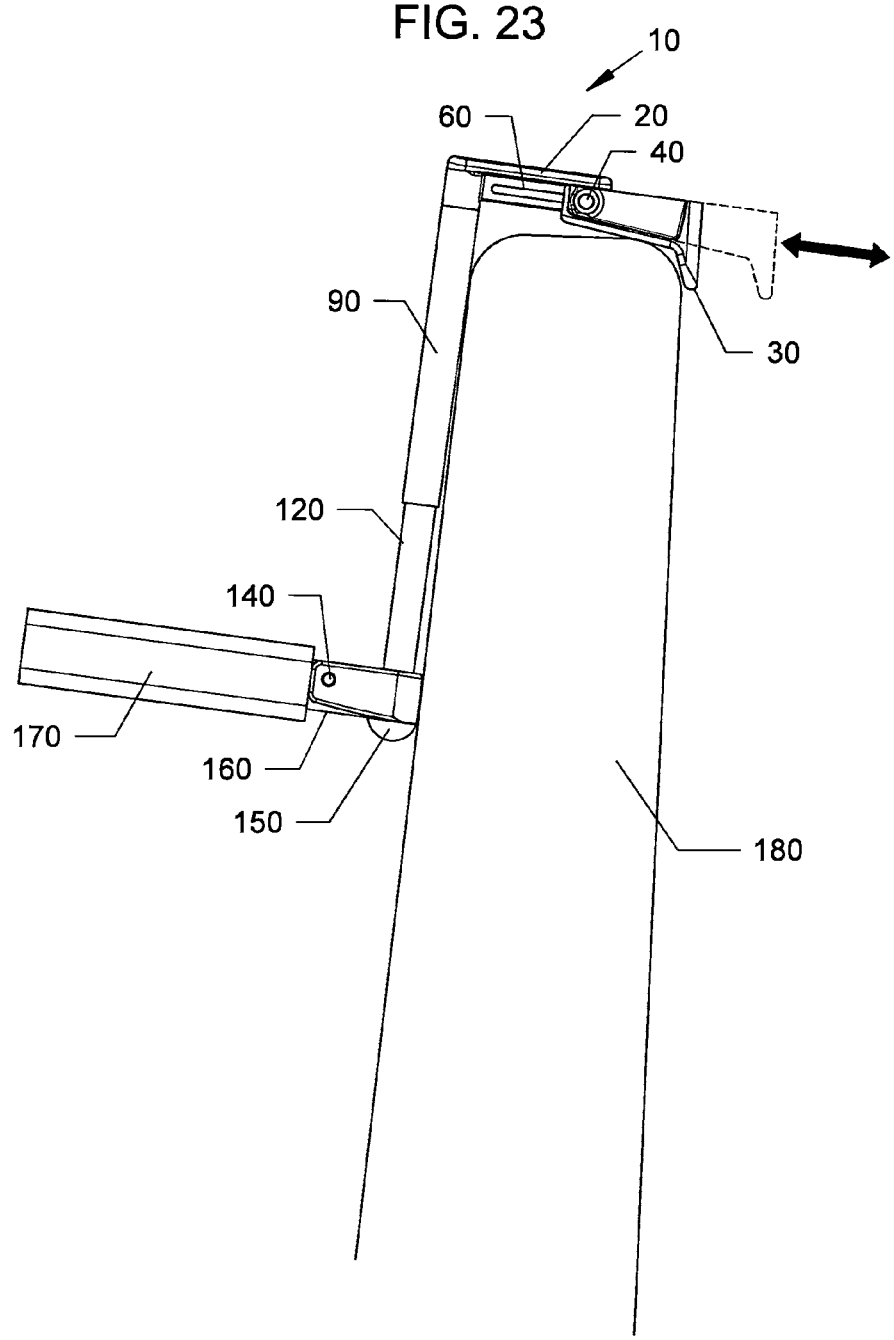

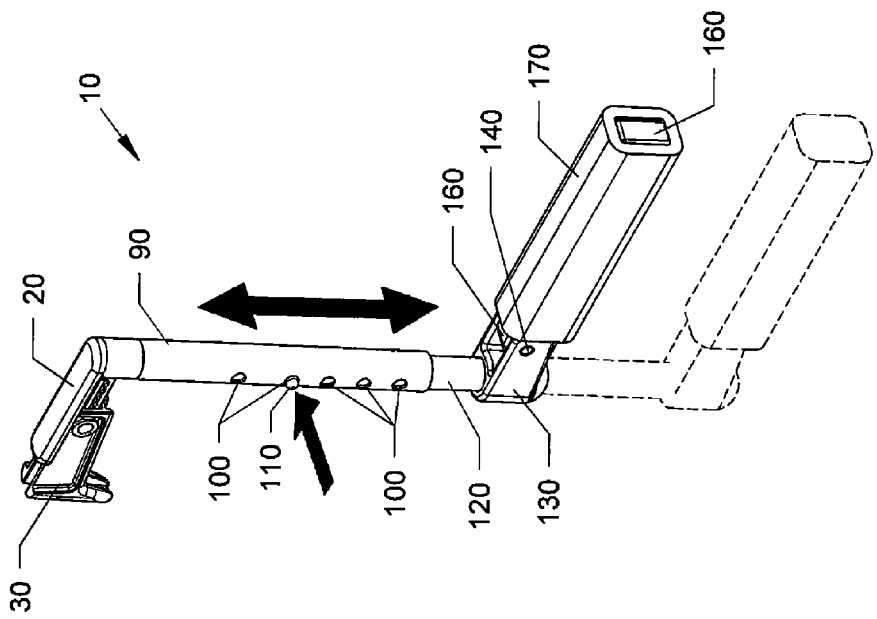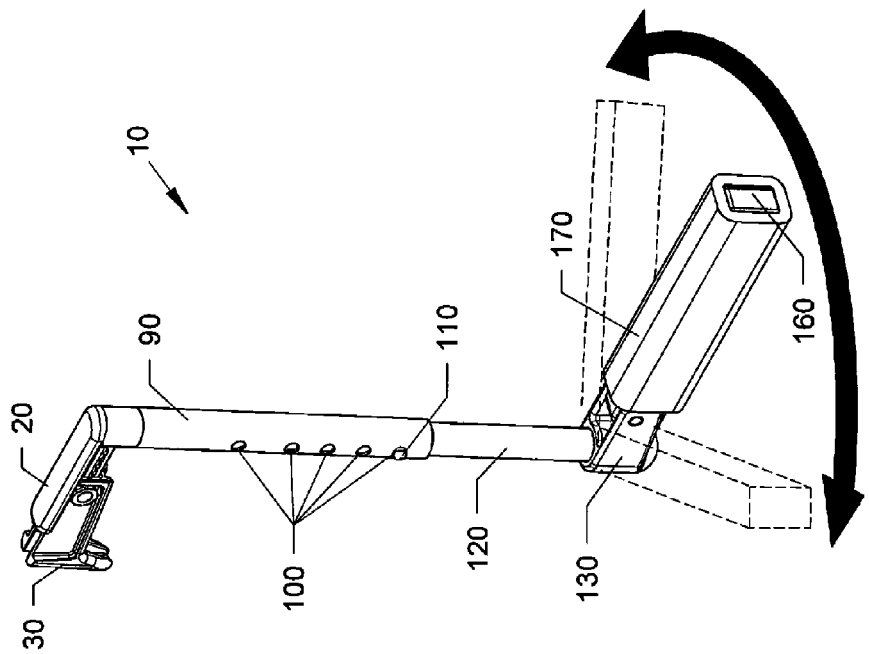

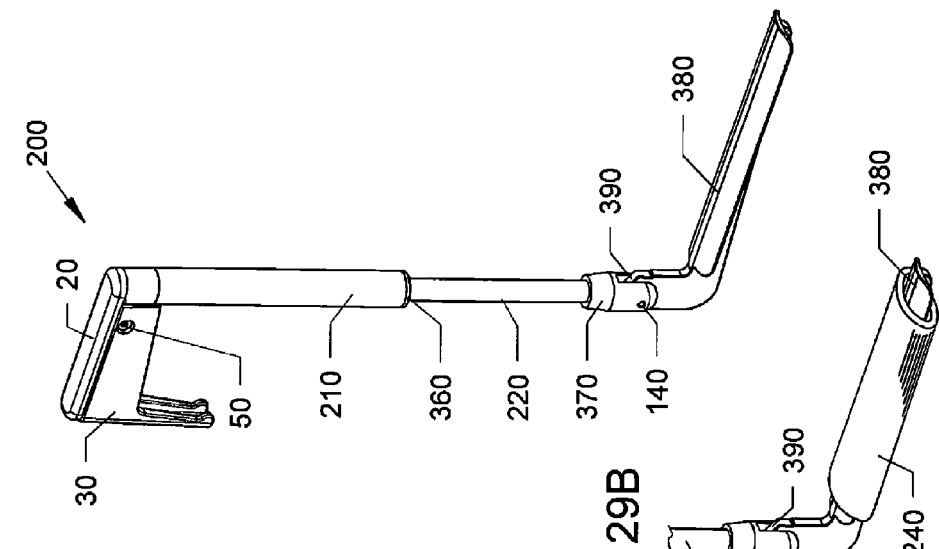
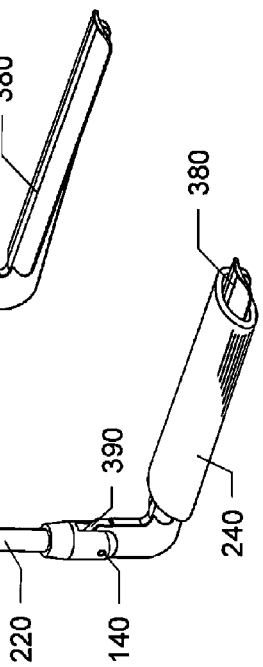

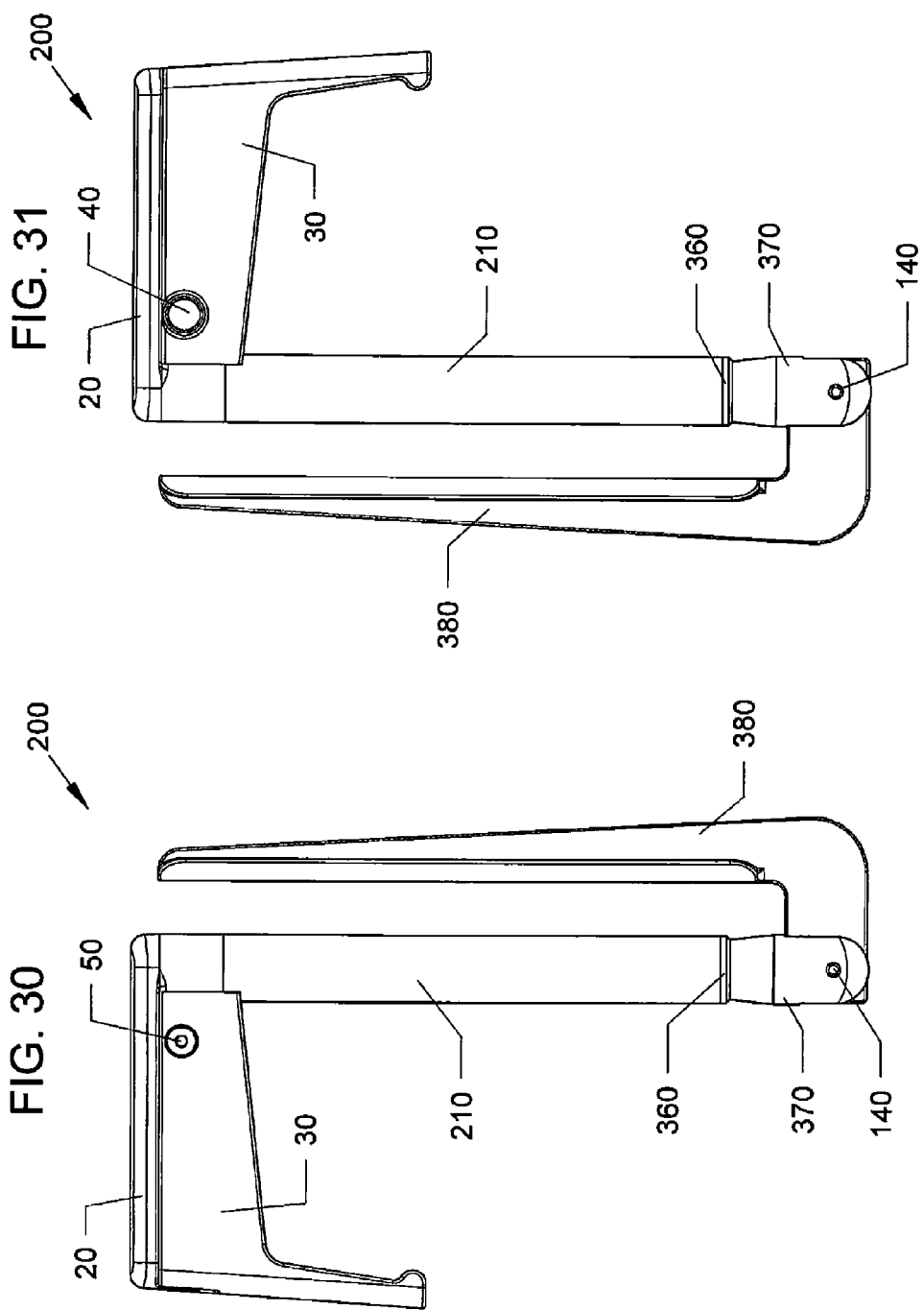

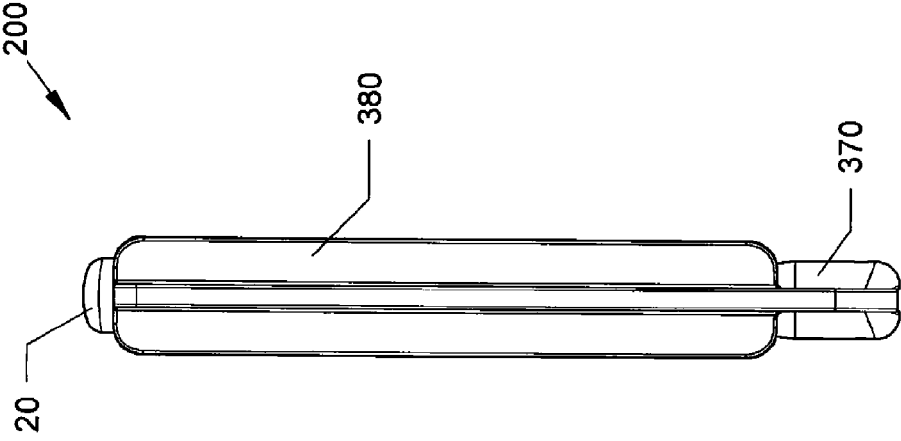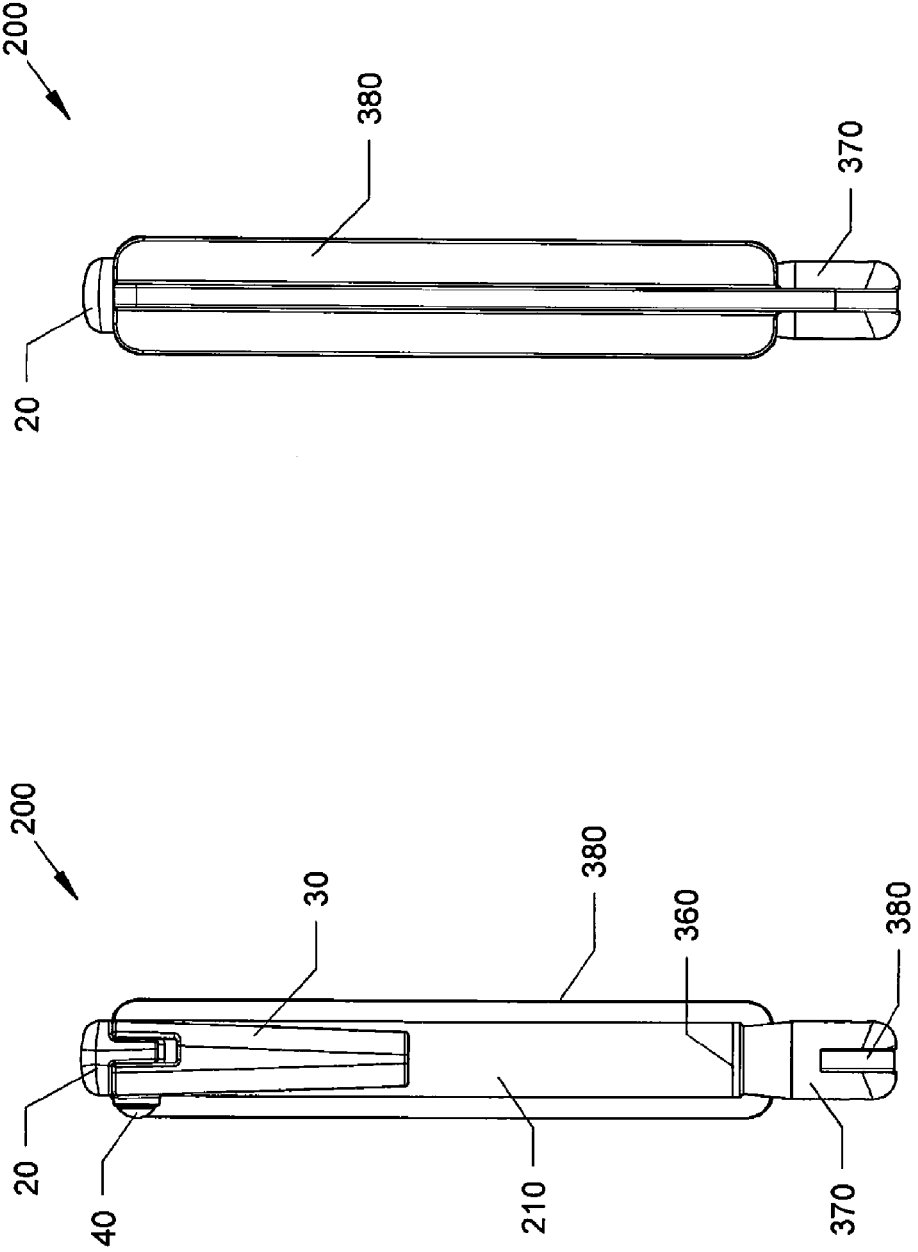

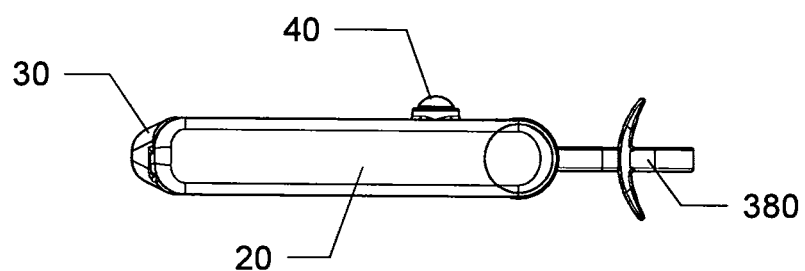
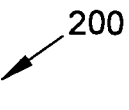
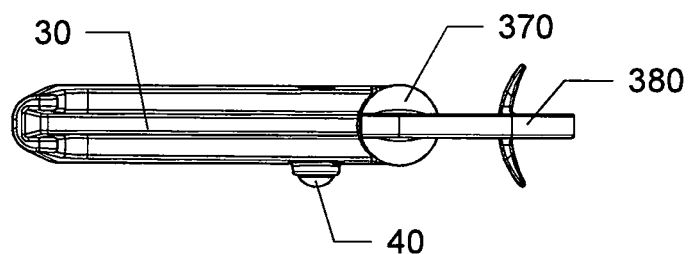

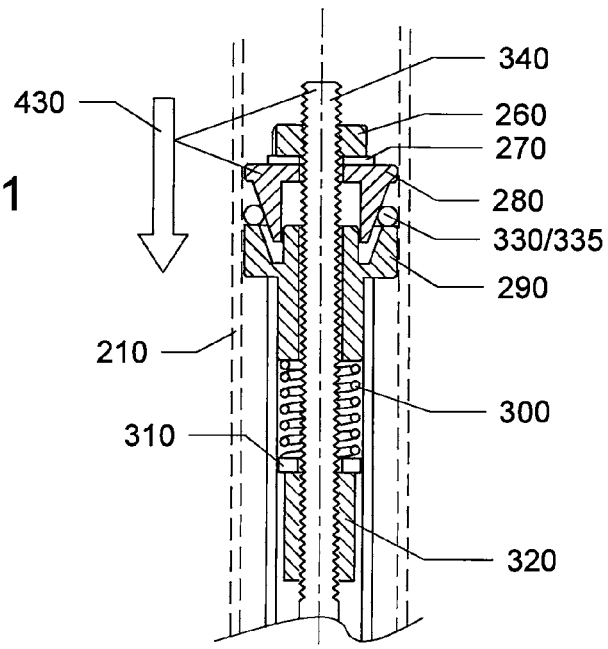
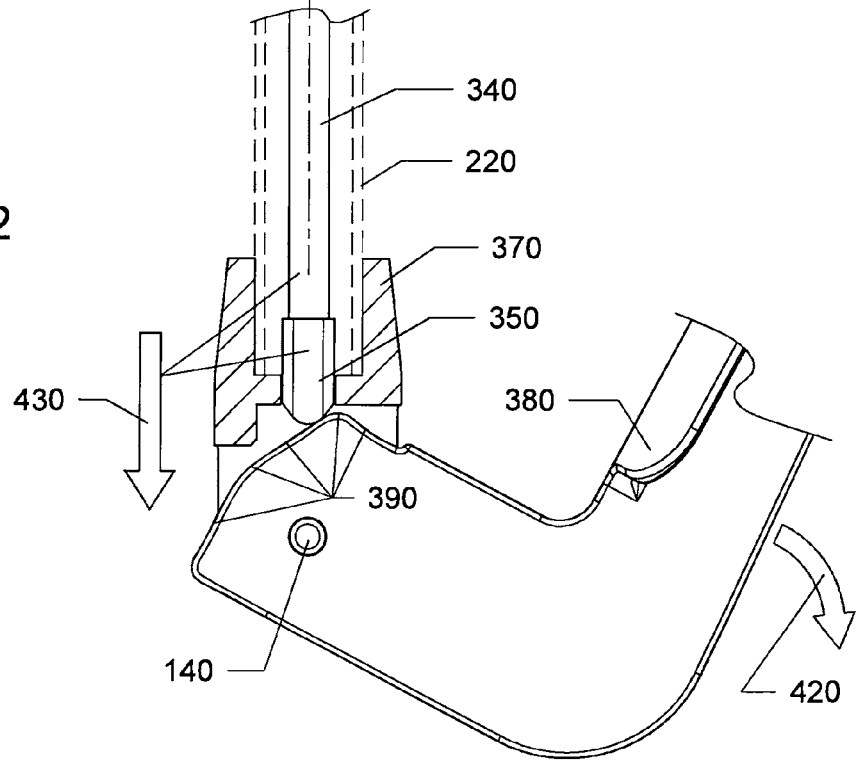

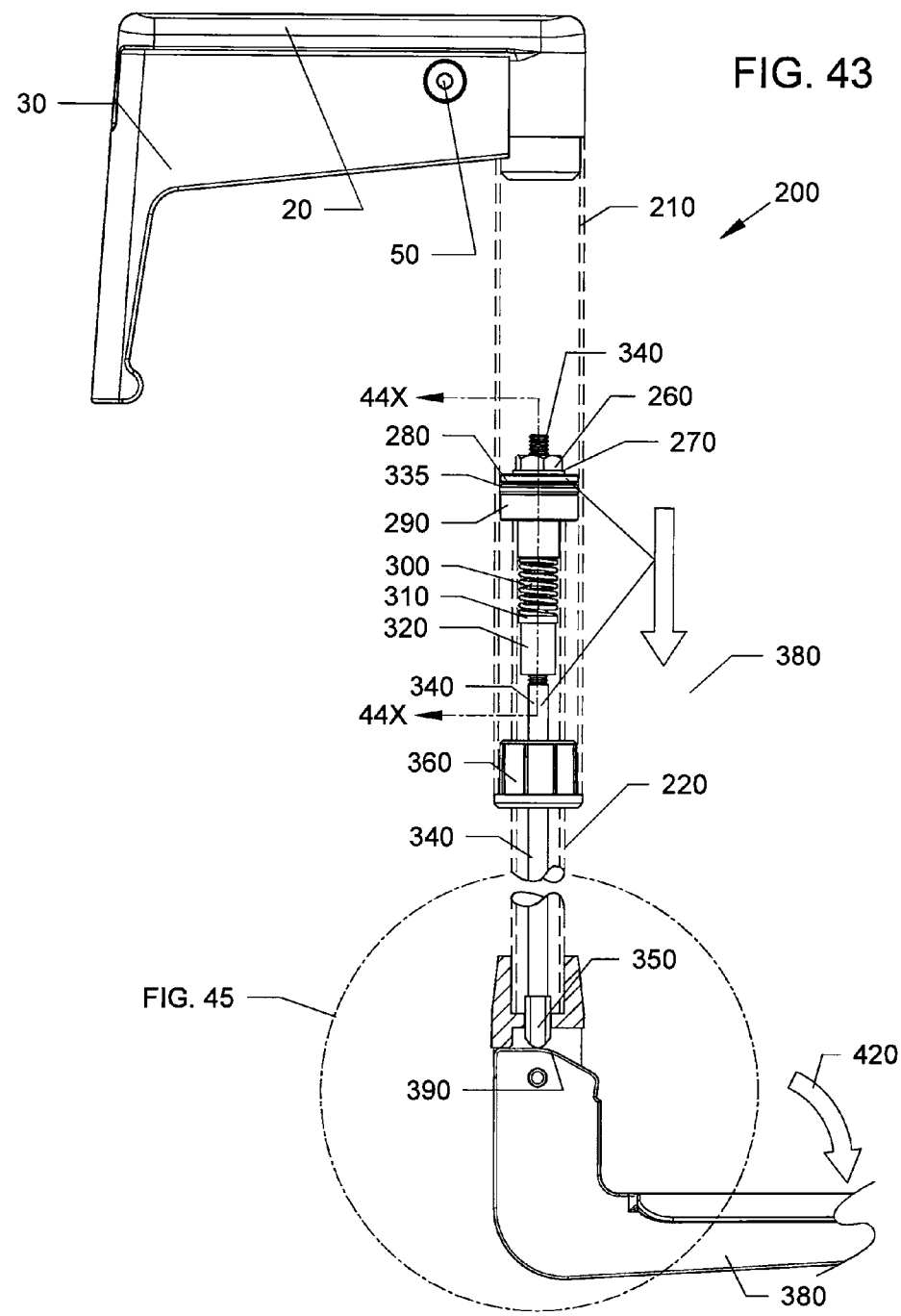

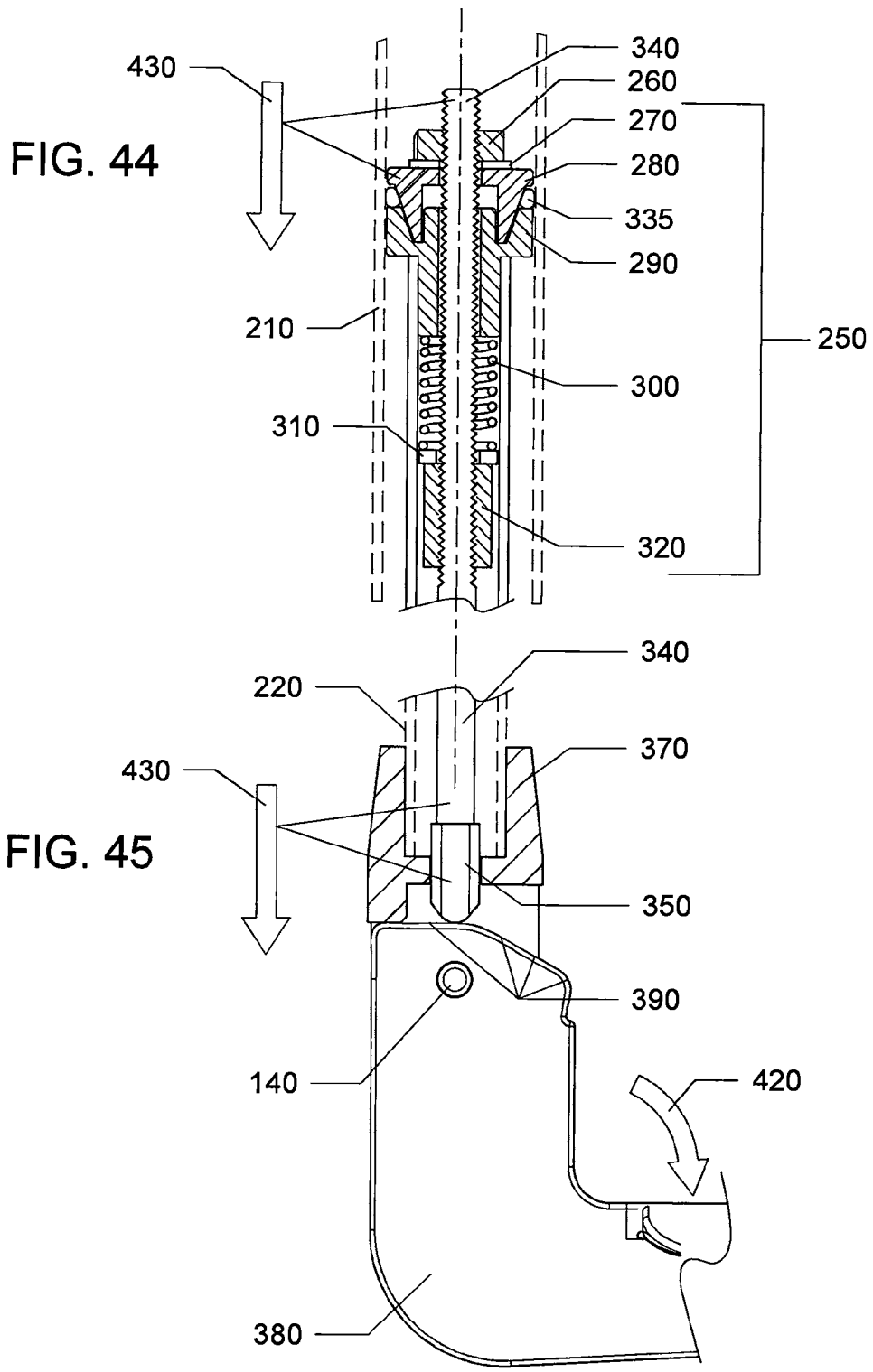

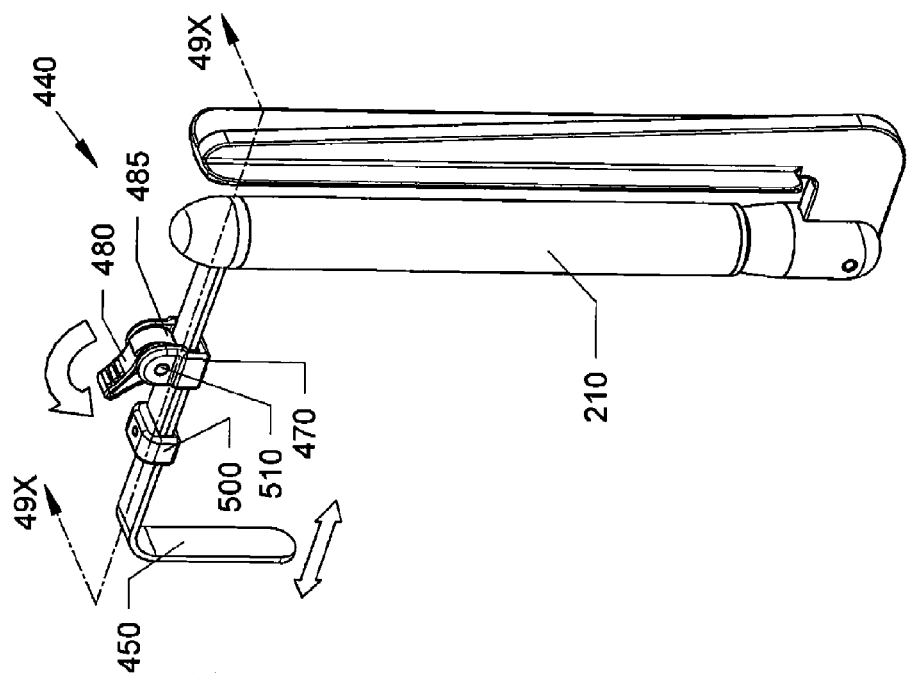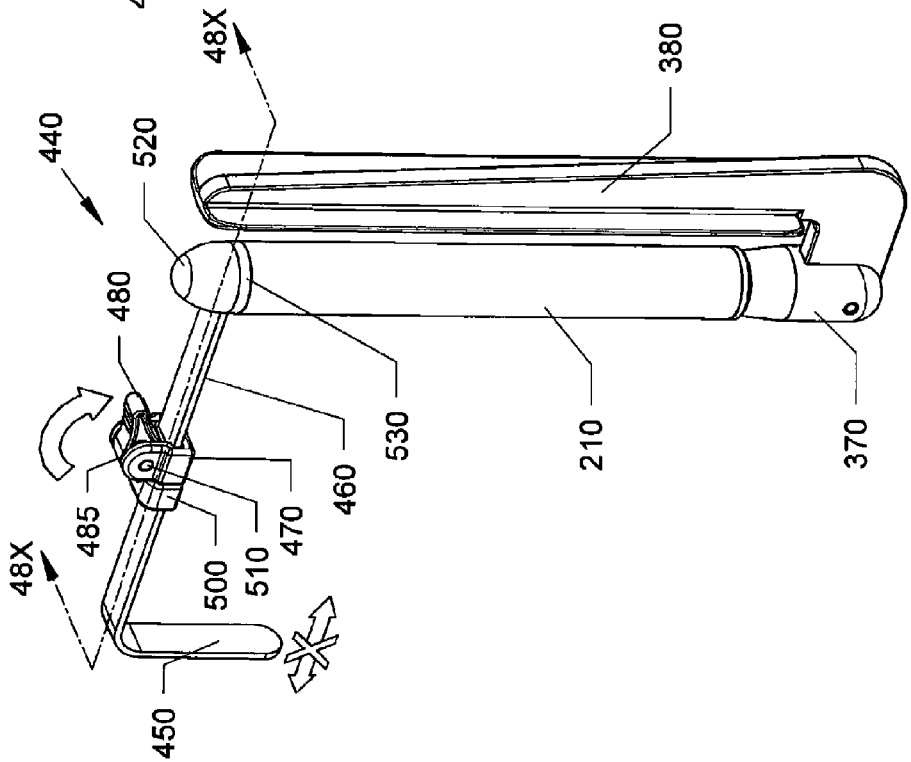

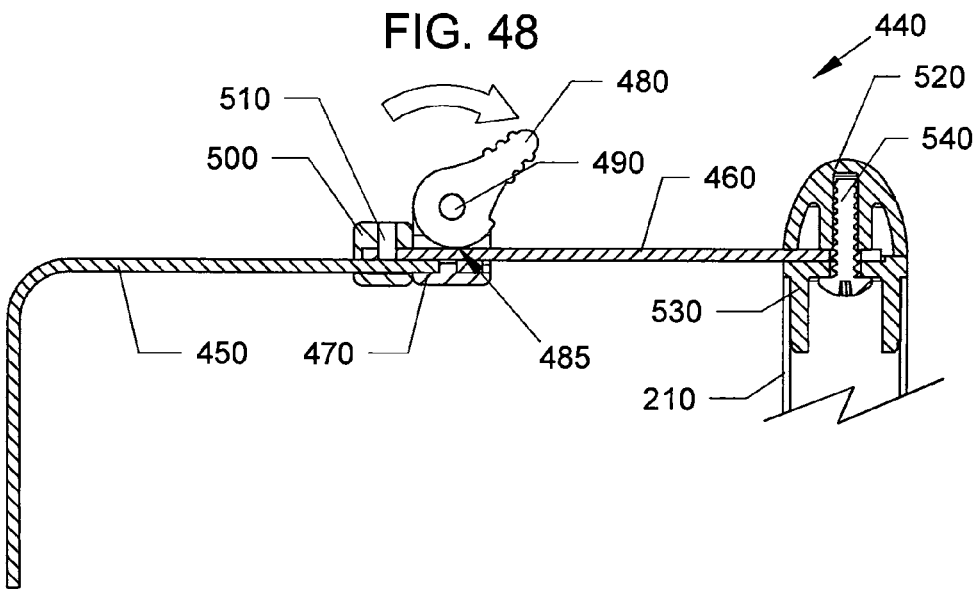
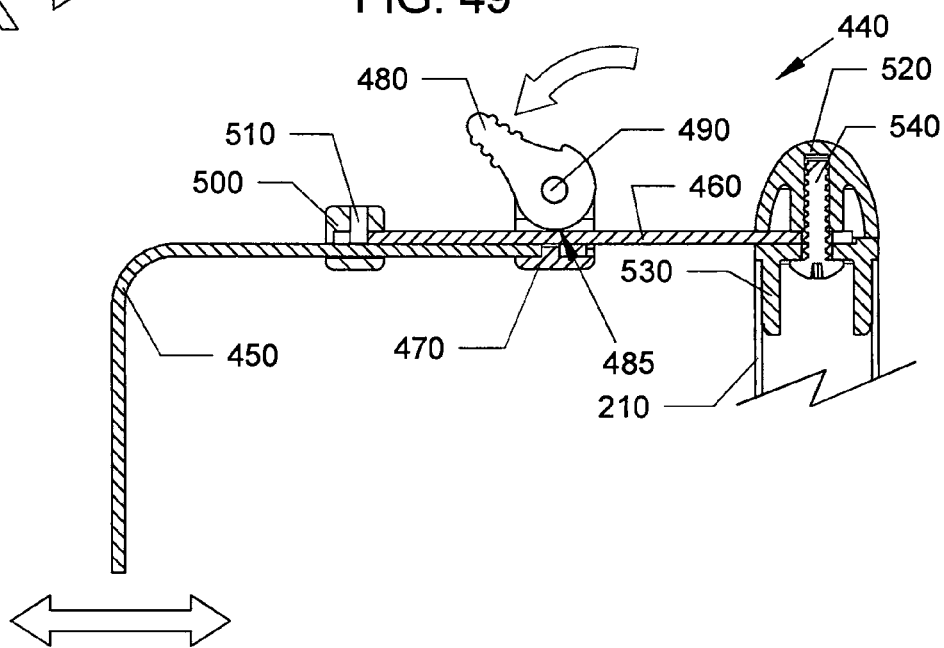

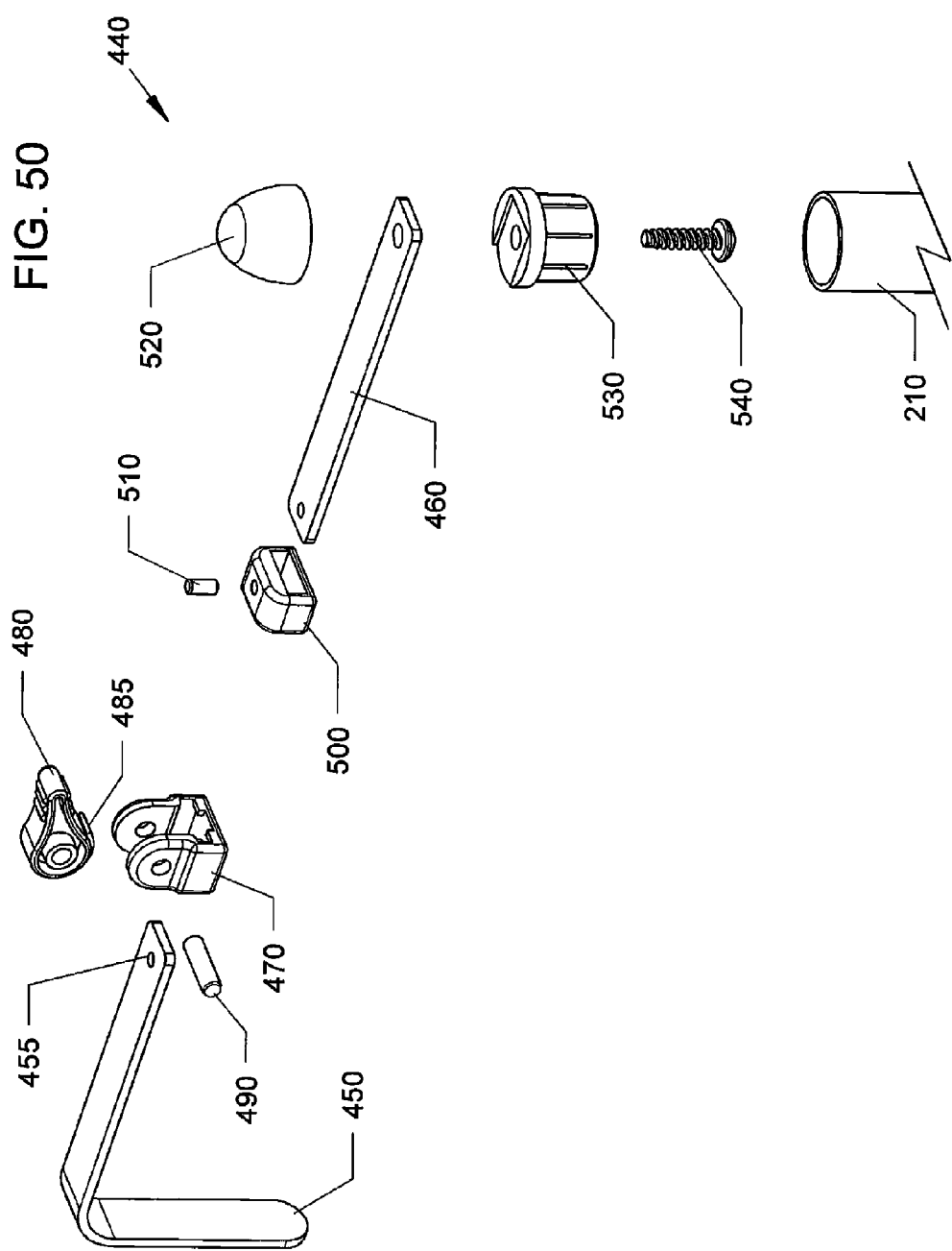

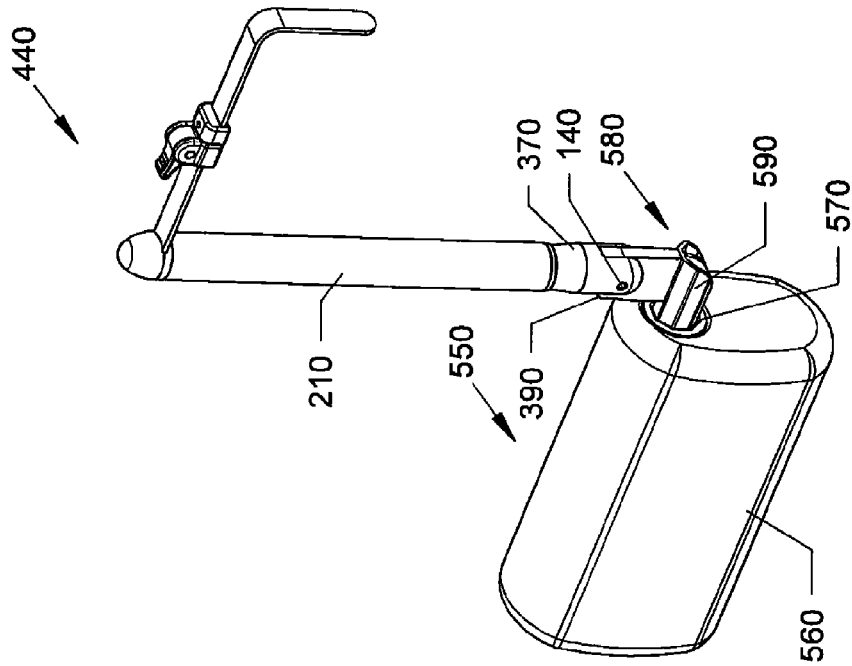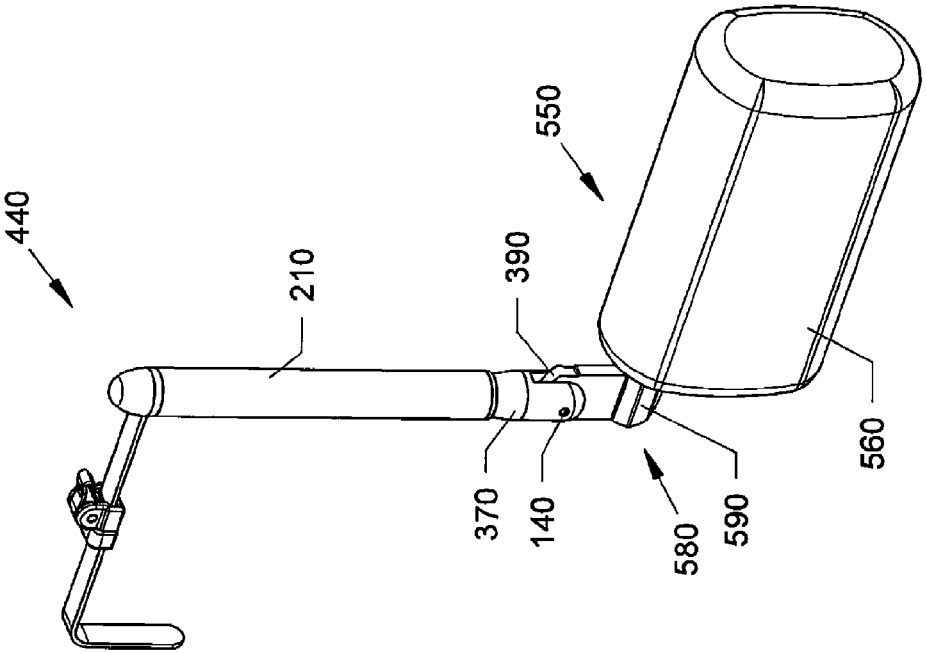

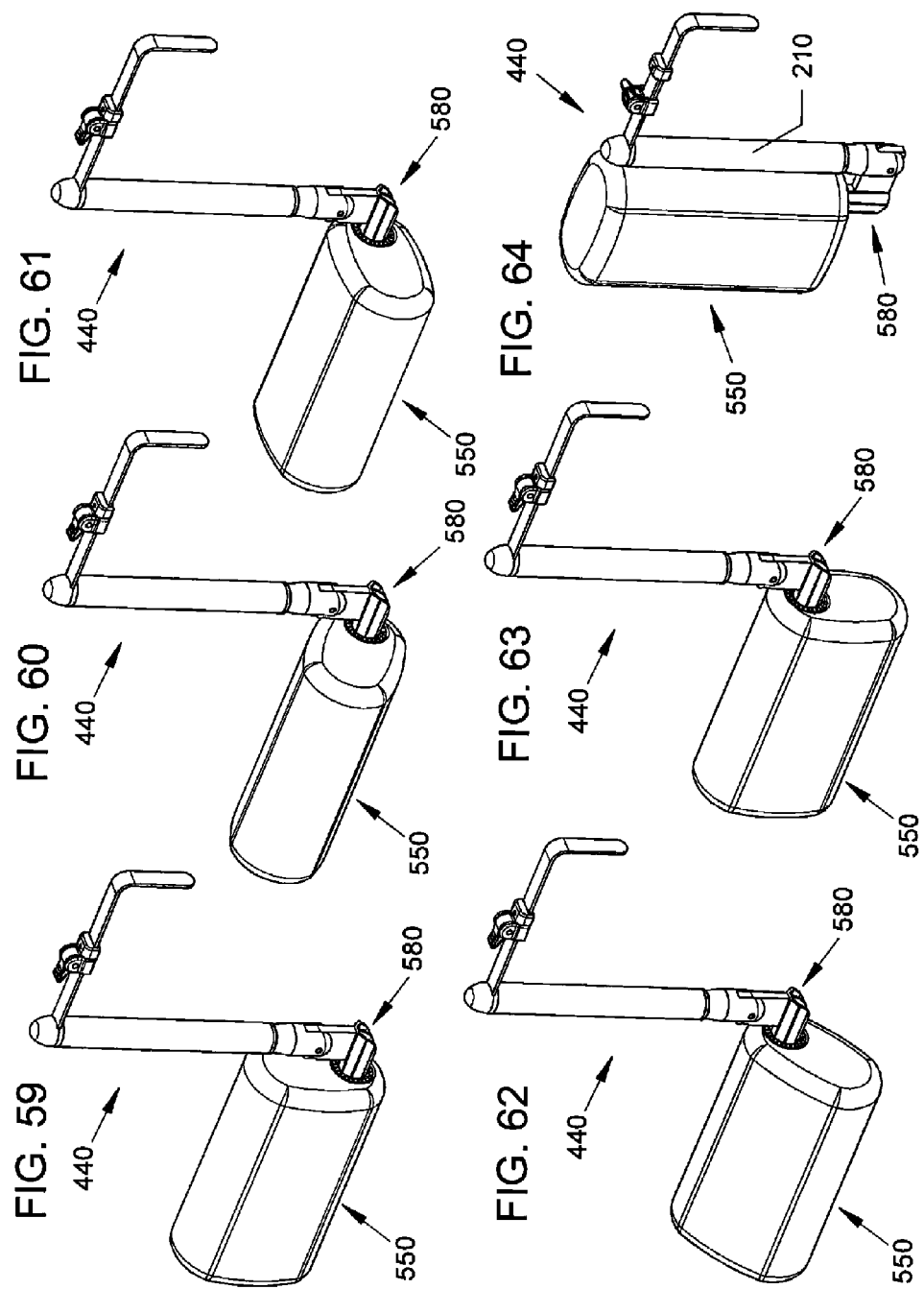

SIDE HEADREST WITH CHIN SUPPORT AND CLAMP

This application is a Continuation-In-Part of U.S. patent application Ser. No. 14/154,290 filed Jan. 14, 2014, now U.S. Pat. No. 9,079,520, which is incorporated by reference in its' entirety.

FIELD OF INVENTION

This invention relates to attachable and detachable head supports, and in particular to apparatus, devices, systems, and methods for clamping a portable headrest with chin support on top a back of a seat, that is both adjustable and foldable for portability.

BACKGROUND AND PRIOR ART

Passengers and travelers that travel over long distances with or without stop-over's typically have difficulty relaxing and falling asleep while sitting in upright positions. Most seats on aircraft, busses, trains and the like, have limited capability of allowing the seat to be fully reclined to a horizontal position. Most seats cannot fully recline since a reclined seat would hit against a passenger sitting behind. As such, the passenger/traveler has to try to relax and sleep in a generally upright position.

A problem with sitting upright is that the head of the seated passenger/traveler will tend to fall sideways and foreword over time. Using one's hand to support one's head is difficult since there is nothing for the bent elbow to rest on, and is also uncomfortable.

Seat belt harnesses and cross-chest straps may keep the passenger/traveler in a vertical position, but do not prevent their head from bending side to side or bending forward.

A popular type of travel aid is the ergonomic pillow generally formed from foam with a side cut-out so that the pillow can wrap about one's neck. See for example, U.S. Des. D444,980 to Mowat et al. However, these types of pillows are best used by persons in generally horizontal sleeping positions, which do not have the problem of the passenger/traveler being in an upright sitting position where they can tend to fall forward. Additionally, these types of foam pillows can be quite bulky and are not easily collapsible.

Attempts have been made of the years to attach headrests on seats. See for example, U.S. Pat. No. 42,084 to Hambujer; U.S. Pat. No. 104,473 to Lyon et al.; U.S. Pat. No. 162,784 to White; U.S. Pat. No. 221,752 to Taylor; U.S. Pat. No. 379,987 to Ryan; U.S. Pat. No. 426,069 to Rogers; U.S. Pat. No. 2,55,814 to Pulsifer; and U.S. Pat. No. 7,393,057 to Fraser.

However, these headrest supports are generally limited to single pads, curved bars, which rest against the side or back of the head, and do not prevent the passenger/traveler from falling forward. Additionally, these devices are generally bulky, and do not fold up when not being used.

Thus, the need exists for solutions to the above problems with the prior art.

SUMMARY OF THE INVENTION

A primary objective of the present invention is to provide apparatus, devices, systems, and methods for clamping a portable headrest with chin support to a top or side of a seat back, with a clamp portion being adjustable for different size seat backs.

A secondary objective of the present invention is to provide apparatus, devices, systems, and methods for clamping a portable headrest with chin support to a top or side of a seat back, having an adjustable chin support for supporting one's head at different heights depending on the size of the seated passenger.

A third objective of the present invention is to provide apparatus, devices, systems, and methods for clamping a portable headrest with chin support to a top or side of a seat back, having a height adjustable chin support for supporting a seated passenger's head at different heights depending on the size of the seated passenger.

A fourth objective of the present invention is to provide apparatus, devices, systems, and methods for clamping a portable headrest with chin support to a top or side of a seat back, having a padded chin support for comfortably supporting the chin of the seated passenger.

A fifth objective of the present invention is to provide apparatus, devices, systems, and methods for clamping a portable headrest with chin support to a top or side of a seat back, that is foldable for ease in transport, when not being used.

A sixth objective of the present invention is to provide apparatus, devices, systems, and methods for clamping a portable headrest with chin support to a top or side of a seat back having a vertical member that is length adjustable.

A seventh objective of the present invention is to provide apparatus, devices, systems, and methods for clamping a portable headrest with chin support to a top or side of a seat back, having a clamp that is length adjustable.

An eighth objective of the present invention is to provide apparatus, devices, systems, and methods for clamping a portable headrest with chin support to a top or side of a seat back, with a cushion on the chin support that is rotatable in different increments.

Further objects and advantages of this invention will be apparent from the following detailed description of the presently preferred embodiments which are illustrated schematically in the accompanying drawings.

BRIEF DESCRIPTION OF THE FIGURES

FIG. 1 is a rear top perspective view of the novel headrest in a deployed position.

FIG. 2 is a front bottom perspective view of the headrest of FIG. 1.

FIG. 3 is a rear bottom perspective view of the headrest of FIG. 1.

FIG. 4 is another view of the headrest of FIG. 3 folded for storage.

FIG. 5 is a rear view of the headrest of FIG. 1.

FIG. 6 is a left side view of the headrest of FIG. 1.

FIG. 7 is a front view of the headrest of FIG. 1.

FIG. 8 is a right side view of the headrest of FIG. 1.

FIG. 9 is a top view of the headrest of FIG. 1.

FIG. 10 is a bottom view of the headrest of FIG. 1.

FIG. 13 is a front view of the folded headrest of FIG. 4.

FIG. 14 is a right side view of the folded headrest of FIG. 4.

FIG. 20 is a partial cut-away detail of the clamp base of the headrest showing the head of the lock screw/bolt nested in the first base detent.

FIG. 21 is another view of FIG. 20 showing the head of the lock screw/bolt pushed out of the detent (the release button 40 on the opposite of the view is being pressed).

FIG. 22 is another view of FIG. 21 showing the hook slide adjusted and lock screw/bolt head nested in another detent.

FIG. 23 is a side view of the headrest of the preceding figures clamped to a seat back.

FIG. 24 is a perspective view of the headrest of the preceding figures showing chin rest being rotatable about the bottom tube for best location.

FIG. 25 is a perspective view of the headrest of FIG. 24 showing that the top and bottom tubes telescoping with one another and locked to a different overall length with the spring pin.

FIG. 27 is a top front perspective view of another version of the headrest with telescoping tubes retracted and chin rest folded up.

FIG. 28 is another view of the headrest of FIG. 27 with the chin rest half folded down showing motion arrows depicting the radial and linear adjustment possible in this configuration.

FIG. 29A is another view of the head rest of FIG. 27 with the telescoping tubes fully extended and the chin rest fully deployed.

FIG. 29B is a view of the chin rest of FIG. 29A with an optional foam pad for the chin rest.

FIG. 30 is a left side view of the headrest of FIG. 27.

FIG. 31 is a right side view of the headrest of FIG. 27.

FIG. 32 is a back view of the headrest of FIG. 27.

FIG. 33 is a front view of the headrest of FIG. 27.

FIG. 34 is a bottom view of the headrest of FIG. 27.

FIG. 35 is a top view of the headrest of FIG. 27.

FIG. 41 is an enlarged detailed section view of tube lock assembly 250 of FIG. 40 along arrows 41X.

FIG. 42 is an enlarged detailed view of the cam mechanism from FIG. 40.

FIG. 43 is another side view of the head rest of FIG. 37 with the chin rest fully folded down.

FIG. 44 is an enlarged detailed cross-sectional view of the tube lock mechanism from FIG. 43. The expander flange can be seen fully compressing the O-ring locking the tubes together.

FIG. 45 is an enlarged cross sectional view of the cam mechanism of FIG. 43.

FIG. 46 is a top perspective view of another version of the headrest with a sliding metal hook assembly that uses a cam lock lever to set the hook extension.

FIG. 47 is another view of the headrest of FIG. 46 showing the cam lock lever oriented away from the upper tube indicating that the hook is unlocked.

FIG. 48 is a cross-sectional view of the hook section of the headrest of FIG. 46 along arrows 48X.

FIG. 49 is another cross-sectional view of FIG. 47 along arrows 49X showing cam locking surface out of contact with the hook leg top unlocking the assembly.

FIG. 50 is an exploded view of the metal hook assembly of FIG. 46.

FIG. 51 is a front perspective view of another version of the headrest with an adjustable, rotating chin rest.

FIG. 52 is a rear perspective view of headrest of FIG. 51.

FIG. 59 is a top perspective view of the headrest of the preceding Figures with the adjustable chin rest. The chin rest is adjusted to its maximum height.

FIG. 60 is another top perspective view of the headrest of FIG. 59 with the chin rest adjusted 45 degrees from its maximum height.

FIG. 61 is another top perspective view of the headrest of FIG. 59 with the chin rest adjusted 90 degrees from its maximum height.

FIG. 62 is another top perspective view of the headrest of FIG. 59 with the chin rest adjusted 135 degrees from its maximum height.

FIG. 63 is another top perspective view of the headrest of FIG. 59 with the chin rest adjusted 180 degrees from its maximum height.

FIG. 64 is another top perspective view of the headrest of FIG. 63 with the chin rest folded up.

DESCRIPTION OF THE PREFERRED EMBODIMENTS

Figure 12:
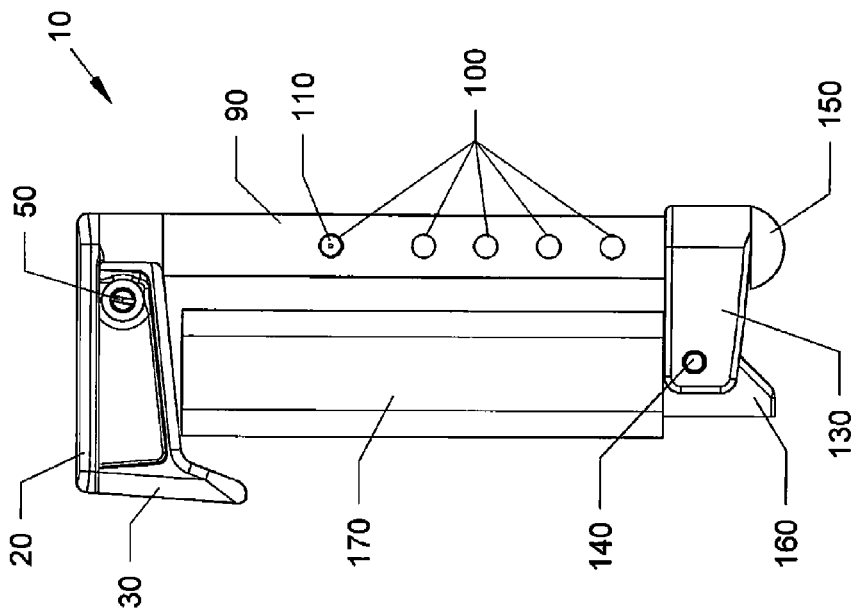
FIG. 12 is a left side view of the folded headrest of FIG. 4.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Portable seat back headrest.
20 Hook base.
30 Hook slide.
40 Hook release button.
50 Hook lock screw/bolt with enlarged head.
60 Lock screw slot in base.
70 Lock detents in base.
80 Release spring.
90 Top tube.
100 Holes in top tube for length adjustment.
110 Spring pin in bottom tube for length adjustment.
120 Bottom tube.
130 Rotating chin rest hinge allows chin rest to rotate about bottom tube.
140 Chin rest hinge pin.
150 Bottom tube cap.
160 Chin rest.
170 Chin rest foam cushion tube fits over chin rest.
180 Seat back.
190 Chin rest user.
200 second headrest.
210 second headrest top tube.
220 second headrest bottom tube.
240 second headrest optional chin rest cushion.
250 Tube lock assembly.
260 Tube lock adjustment nut.
270 Tube lock adjustment washer.
280 Tube lock O-ring expander flange.
290 Tube lock fixed flange.
300 Tube lock spring.
310 Tube lock spring washer.
320 Spring adjustment spacer.
330 Tube lock O-ring (uncompressed).
335 Tube lock O-ring (compressed).
340 Tube lock shaft.
350 Cam follower.
360 Top tube bushing.
370 Chin rest mounting flange.
380 second headrest chin rest with integrated tube lock cam.
390 Tube lock cam.
400 Linear motion arrow of telescoping tube length.
410 Radial motion arrow of chin rest rotation.
420 Curve motion arrow of chin rest folding down.
430 Linear motion of tube lock shaft pulling expander flange down as a result of tube lock cam rotation.
440 Headrest with metal cam lock hook.
450 hook.
455. right opening
460 hook leg.
470 Cam lock bracket.
480 Cam lock lever.
485 Locking cam surface of cam lock lever.
490 Cam lock pin.
500 Cam stop bracket.
510 Cam stop pin.
520 Hook mount finial.
530 Finial base.
540 Finial mount screw.
550 Adjustable, rotating chin rest.
560 Chin rest cushion.
565 Cavity in chin rest cushion contains chin rest hex core.
570 Cushion hex core is molded or sewn into cushion.
580 Folding chin rest with hex shaft.
590 Chin rest hex shaft.
600 pad
610 slot FIG. 1 is a rear top perspective view of the novel headrest 10 in a deployed position. FIG. 2 is a front bottom perspective view of the headrest 10 of FIG. 1. FIG. 3 is a rear bottom perspective view of the headrest 10 of FIG. 1.

FIG. 4 is another view of the headrest of FIG. 3 folded for storage.

FIG. 5 is a rear view of the headrest 10 of FIG. 1. FIG. 6 is a left side view of the headrest 10 of FIG. 1. FIG. 7 is a front view of the headrest 10 of FIG. 1. FIG. 8 is a right side view of the headrest 10 of FIG. 1. FIG. 9 is a top view of the headrest 10 of FIG. 1. FIG. 10 is a bottom view of the headrest 10 of FIG. 1.

Referring to FIGS. 1-3 and 5-10, the novel head rest 10 includes a hook base 20 attached to the upper end of a top tube 90. A hook slide 30 with hook release button 40 can slide relative to a lock screw slot 60 in base 20 having lock detents 70 in the base 20. The top tube 90 can telescopingly slide about a bottom tube 120. An outwardly extending spring biased pin 110 in bottom tube 120 can pop in and out of through holes 100 in the top tube 90 that allow for different height adjustment of the top tube 90 relative to bottom tube 120.

A rotating chin rest hinge 130 held in place by bottom tube cap 150 allows for horizontally attached chin rest 160 to pivot horizontally relative to the lower end of the bottom tube 120. A chin rest hinge pin 140 attached to the rest hinge 130 and the horizontal chin rest 160, allows for the chin rest 160 to pivot up relative to the pivot pin 140. A cushion sleeve 170 such as a foam sleeve can wrap about the chin rest 160.

Figure 11:
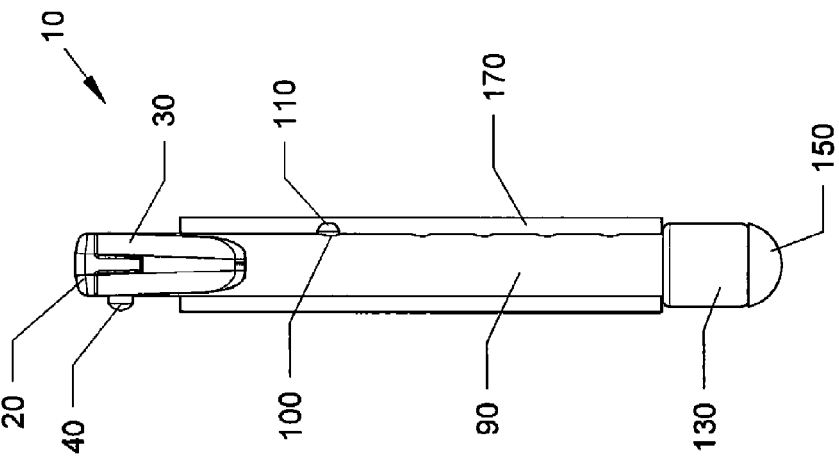
FIG. 11 is a rear view of the folded headrest of FIG. 4.
Figure 15:
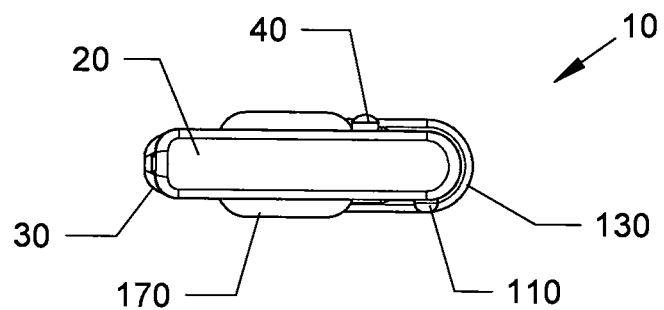
FIG. 15 is a top view of the folded headrest of FIG. 4.
Figure 16:
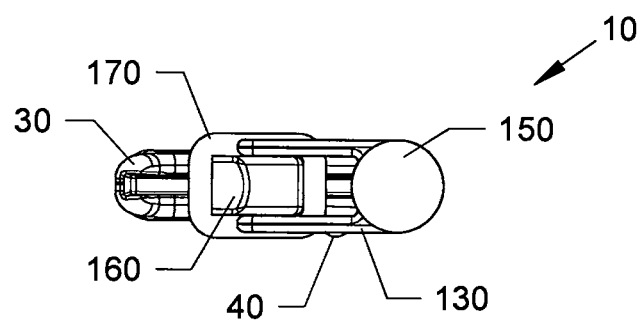
FIG. 16 is a bottom view of the folded headrest of FIG. 4.

FIG. 11 is a rear view of the folded headrest 10 of FIG. 4. FIG. 12 is a left side view of the folded headrest 10 of FIG. 4. FIG. 13 is a front view of the folded headrest 10 of FIG. 4. FIG. 14 is a right side view of the folded headrest 10 of FIG. 4. FIG. 15 is a top view of the folded headrest 10 of FIG. 4. FIG. 16 is a bottom view of the folded headrest 10 of FIG. 4.

Referring to FIGS. 4 and 11-16, the novel headrest 10 can collapsed into a folded position with the hook slide 30 slid inwardly along lock screw slot 60 of the hook base. The top tube 90 can be slid down over bottom tube 120 to be substantially concentric and overlying with one another. The chin rest 160 can be pivoted about chin rest hinge pin 140, and folded upward by hinge pin 140, so that the chin rest 160 is parallel to overlying tubes 90, 120, and hook base 20 is parallel to rest hinge 130.

The folded headrest 10 can be sized in order to fit in a user's pocket, a backpack, a briefcase, handbag, and the like. Additionally, the headrest can be made from lightweight materials, and the like.

Figure 17:
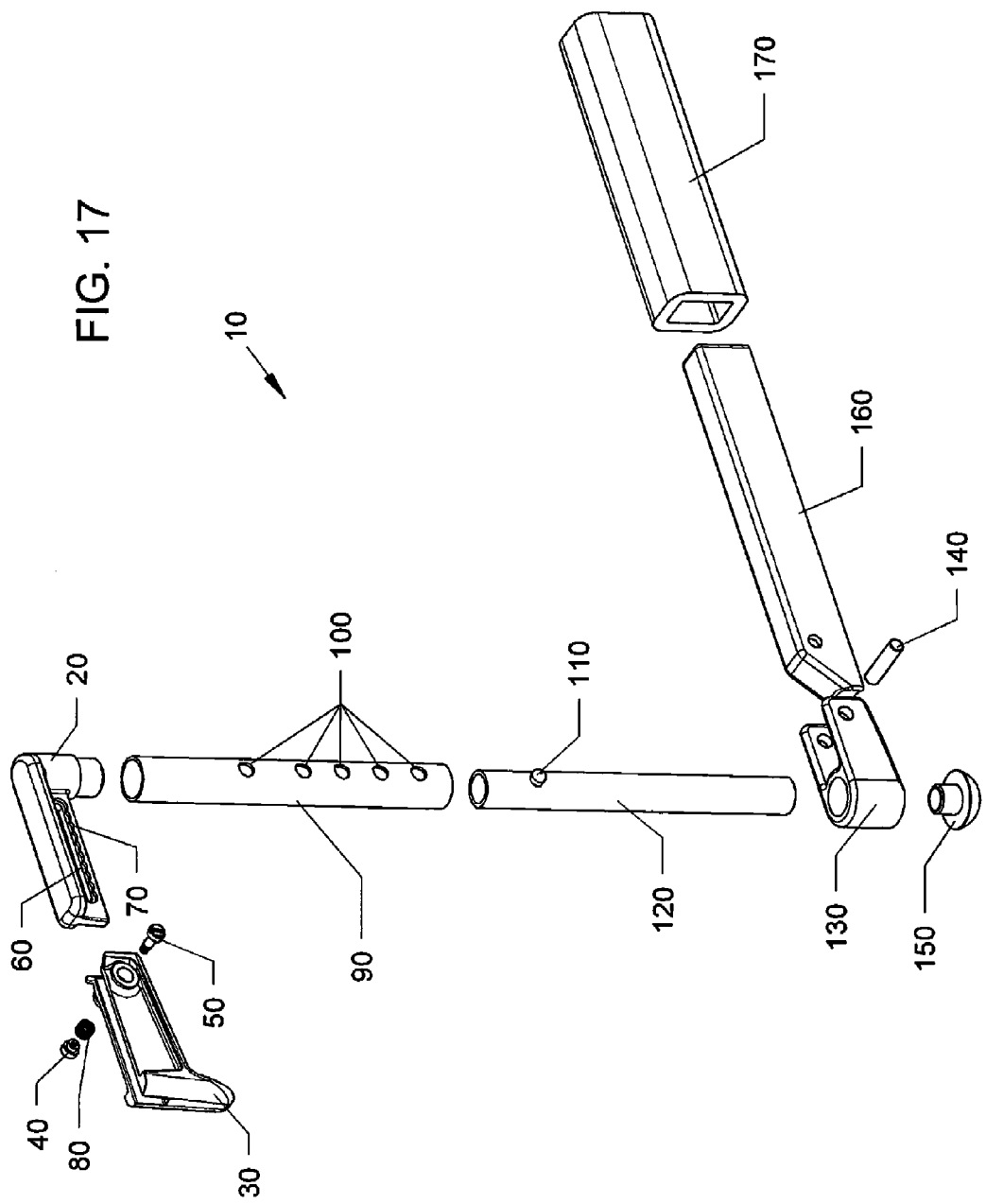
FIG. 17 is an exploded perspective view of the headrest of the preceding figures.

FIG. 17 is an exploded perspective view of the headrest 10 of the preceding figures. The detail of the hook lock screw 50 with release spring 80 which can overlay the threaded end of the screw 50 and a hook release button 40.

Figure 18:
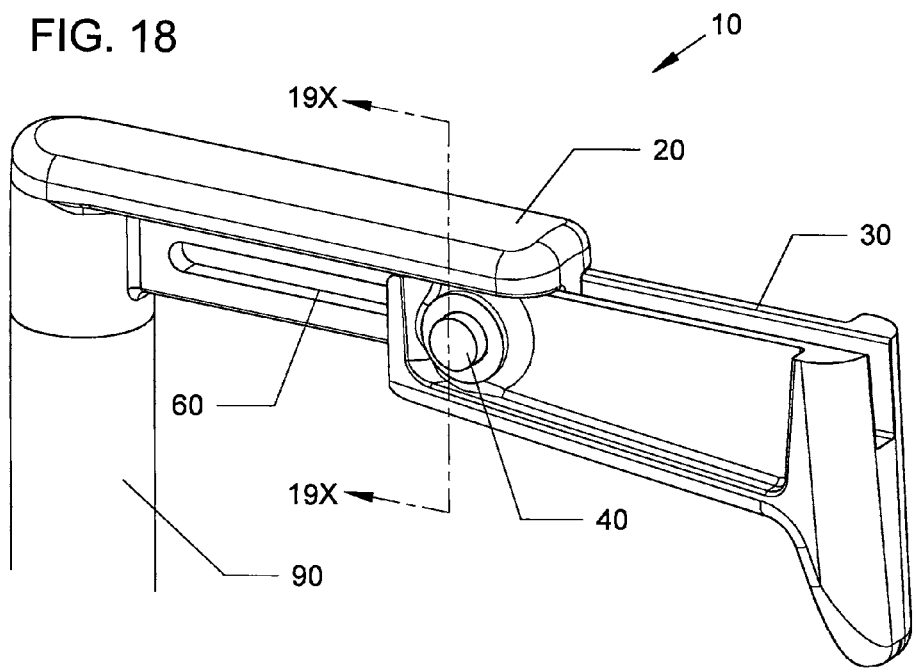
FIG. 18 is an enlarged view of the hook base and hook slide of the headrest of the preceding figures.

FIG. 18 is an enlarged view of the hook base 20 and hook slide 30 of the headrest 10 of the preceding figures.

Figure 19A:
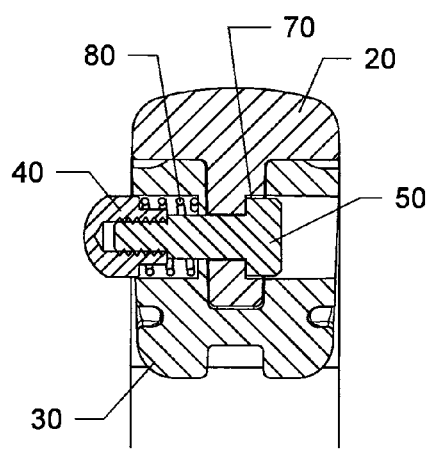
FIG. 19A is a cross-sectional view of the hook base and slide of the headrest of FIG. 18 along arrows 19X showing the release button and lock screw/bolt with the lock screw/bolt nested under spring pressure by spring into one of several detents in the base (a locked clamp position).

FIG. 19A is a cross-sectional view of the hook base 20 and slide 30 of the headrest 10 of FIG. 18 along arrows 19X showing the release button 40 and lock screw/bolt 50 with the lock screw/bolt 50 nested under spring pressure by spring 80 into one of several detents 70 in the base 20. In this view, the hook slide 30 (clamp) is locked in a fixed horizontal position.

Figure 19B:
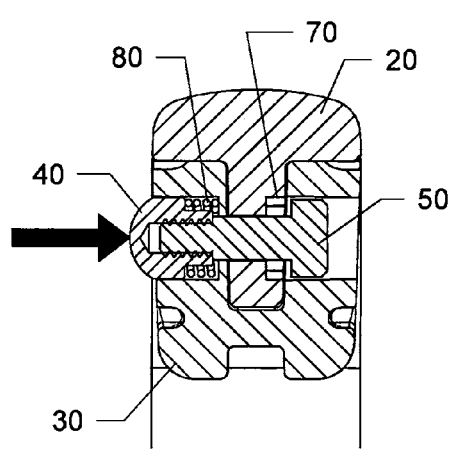
FIG. 19B is another cross-sectional view of the hook base and hook slide of FIG. 18 along arrows 19X with the release button being pressed and the lock screw/bolt released from the detent in the base (an unlocked clamp position).

FIG. 19B is another cross-sectional view of the hook base 20 and hook slide 30 of FIG. 18 along arrows 19X with the release button 40 being pressed and the lock screw/bolt 50 released from the detent 70 in the base 20. In this view, the hook slide 30 (clamp) is unlocked and is adjustable for different thickness widths of the back of the seat.

FIG. 20 is a partial cut-away detail of the clamp base 20 of the headrest showing the head of the lock screw/bolt 50 nested in the first base detent 70.

FIG. 21 is another view of FIG. 20 showing the head of the lock screw/bolt 50 pushed out of the detent 70 (the release button 40 on the opposite of the view is being pressed). The hook slide 30 can then be adjusted slide relative to the hook base 20.

FIG. 22 is another view of FIG. 21 showing the hook slide 30 adjusted and the lock screw/bolt 50 head nested in an alternate detent 70.

FIG. 23 is a side view of the headrest 10 of the preceding figures with the hook slide 30 having an outer hook end clamped to a rear surface edges of the seat back 160, with the top tube 90 on the front side of seat back 160

FIG. 24 is a perspective view of the headrest 10 of the preceding figures showing chin rest 160 with cushion sleeve 170 being rotatable in a horizontal direction about the bottom vertical tube 190 for best location.

FIG. 25 is a perspective view of the headrest 10 of FIG. 24 showing that the top tube 90 and bottom tube 120 telescoping with one another and locked to a different overall length by the outwardly spring biased pin 110.

Figure 26:
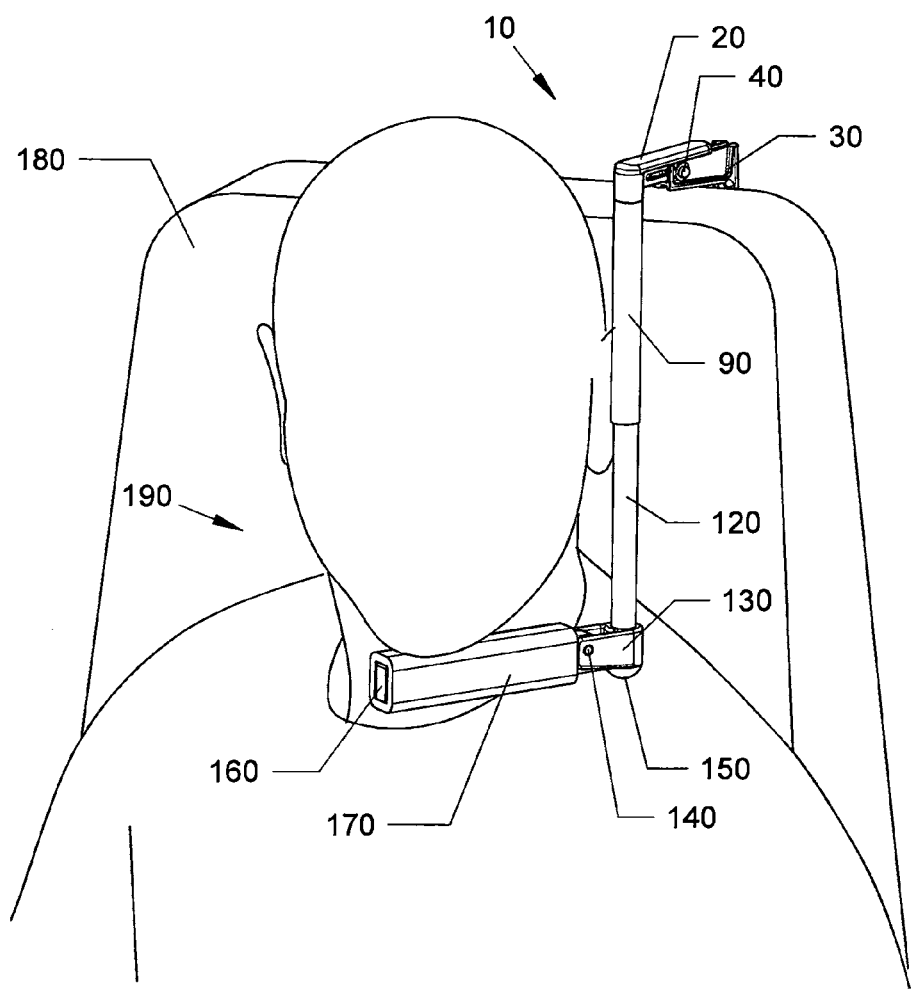
FIG. 26 is a perspective view of the headrest of the preceding figures showing a person resting their chin on an installed and adjusted headrest.

FIG. 26 is a perspective view of the headrest 10 of the preceding figures showing a person 190 resting their chin on the chin rest 160 with cushioned sleeve 170 of the installed and adjusted headrest 10.

The novel headrest 10 can be made from components, such as but not limited to metal, such as aluminum, galvanized metal, and the like, or plastic, or combinations thereof.

Another alternative version of the headrest is to have the clamp member, vertical member, and chin rest, to be formed from a pliable material. For example, another headrest can have a possible Z shape formed from a one piece of pliable material, such as aluminum, with a cushion overlayer. The pliable under support can be bent into shape, so that the clamp portion can bend about the top of a backrest, and the chin rest bent into a desired configuration. The pliable material can have a memory when manipulated into a selected shape. Additionally, parts of the headrest can have pliable parts, such as the chin rest, and/or the vertical member and/or the clamp member.

Although the preferred embodiment shows the chin rest portion having a cushion thereon, the novel headrest can also have a cushion about the vertical member. Additionally, the clamp member(s) can also have a cushion.

The invention can have additional shapes as needed. For example, the vertical member can have a pad or blinder shape, having a cushion surface with sufficient space for resting a user's face against. The pad and/or blinder can also be bendable. For example, there can be an underlying material, such as but not limited to aluminum, with a cushion face, with the underlying material having a memory when bent into a selected configuration.

The novel headrest 10 can be configured so that the vertical member is on the left side of the user's face or on the right side of their face. Additionally, two headrests 10 can be used so that the vertical members are on both the left side and right side of the user's face. Still another version can be headrest having both a left vertical member and a right vertical member.

FIG. 27 is a top front perspective view of another version of the headrest 200 with telescoping tubes 210, 220 retracted and chin rest folded up in the up direction of arrow 400. The top tube 210 and bottom tube 220 are not locked together in this configuration.

FIG. 28 is another view of the headrest 200 of FIG. 27 with the chin rest 380 half folded down showing motion arrows 410 depicting the radial and linear adjustment possible in this configuration. The telescoping tube length of tubes 210, 220 can be adjusted along with the rotation of the chin rest 380 relative to the hook base 20 and hook slide 30.

FIG. 29A is another view of the headrest 200 of FIG. 27 with the telescoping tubes 210, 220 fully extended and the chin rest fully deployed. The top and bottom tubes 210, 220 are locked together in this configuration which will be shown and described later. Folding the chin rest 380 down fully locks the tubes 210, 220 together.

FIG. 29B is a view of the chin rest 380 of FIG. 29A with an optional foam pad 240 for the chin rest 380.

FIG. 30 is a left side view of the headrest 200 of FIG. 27. FIG. 31 is a right side view of version of the headrest 200 of FIG. 27. FIG. 32 is a back view of the headrest 200 of FIG. 30. FIG. 33 is a front view of the headrest 200 of FIG. 27. FIG. 34 is a bottom view of the headrest 200 of FIG. 27. FIG. 35 is a top view of the headrest 200 of FIG. 27.

Figure 36:
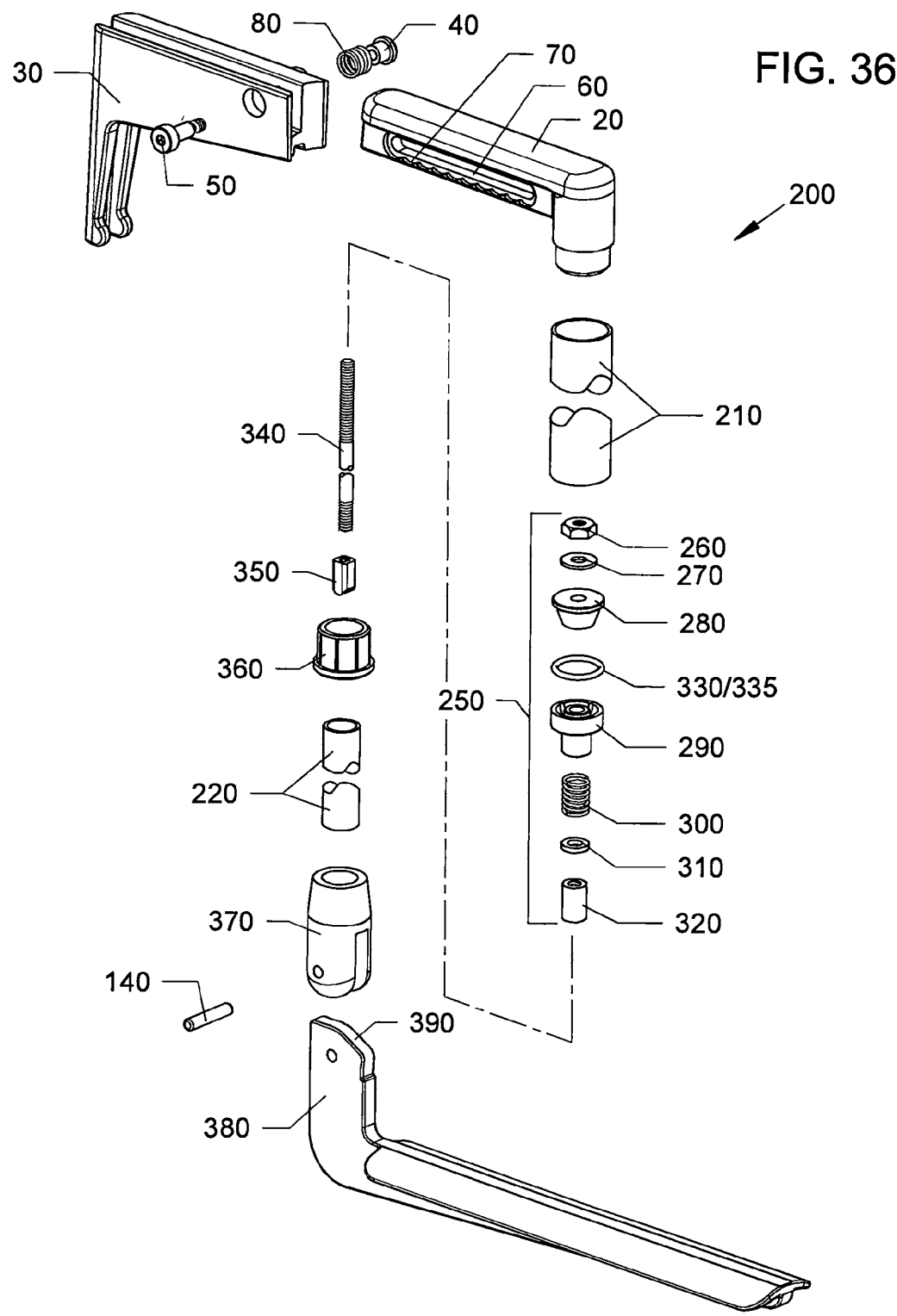
FIG. 36 is a top front exploded perspective view of the head rest of FIG. 27.

FIG. 36 is a top front exploded perspective view of the headrest 200 of FIG. 27. Here, the top tube 210, bottom tube 220, and tube lock shaft 340 have been truncated to in order to show all of the components.

Figure 37:
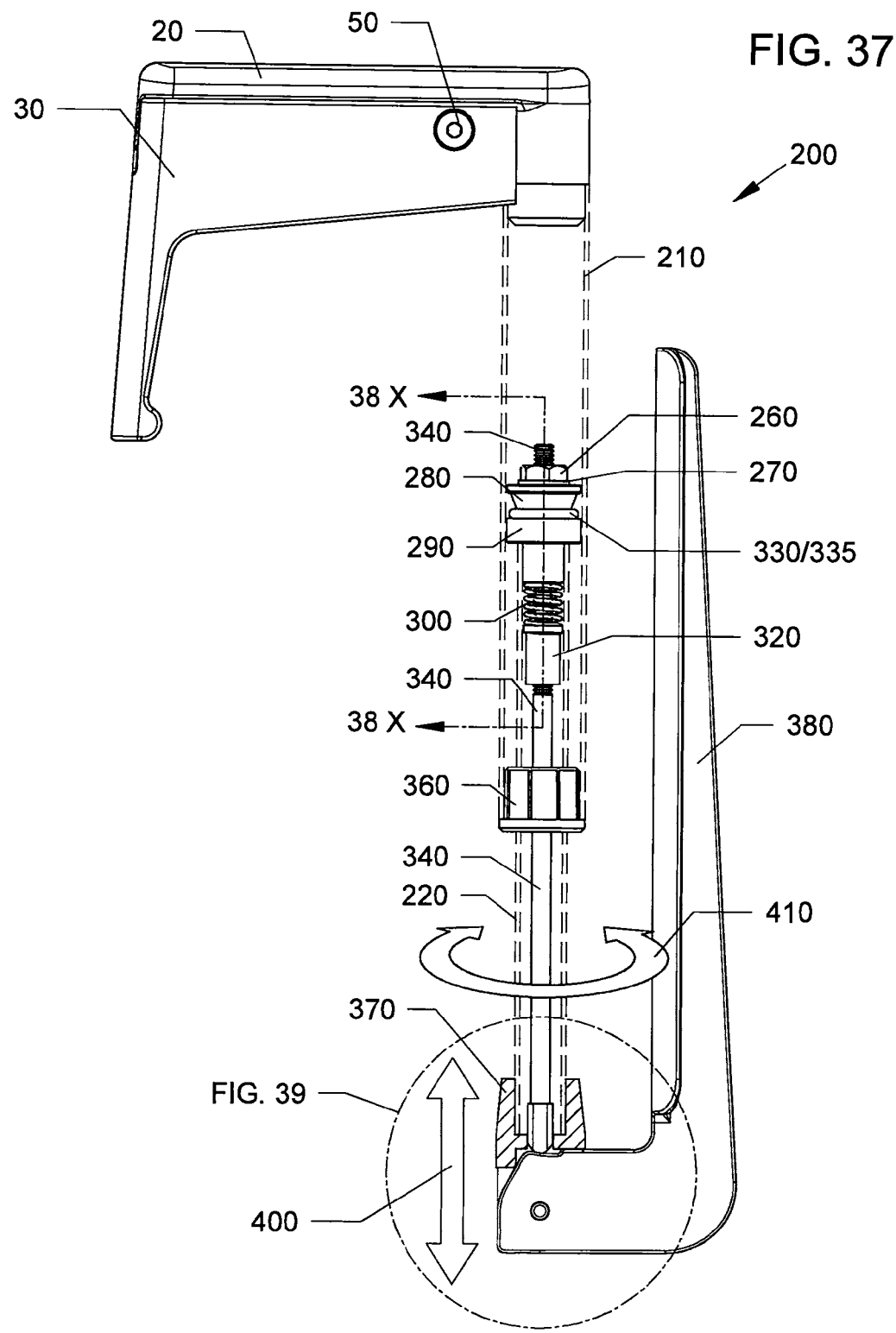
FIG. 37 is a side view of the headrest of FIG. 27 with the chin rest folded fully up and the bottom telescoping tube about half extended.

FIG. 37 is a side view of the headrest of FIG. 27 with the chin rest 380 folded fully up and the bottom telescoping tube 220 about half extended. The top and bottom tubes 210, 220 are ghosted to view the tube lock assembly 250. A top tube bushing 360 is frictionally fit into the hollow bottom end of the upper tube 210 with the upper end of the lower tube 220 fitting inside the top tube bushing 360. The chin rest mount flange 370 is sectioned to view the tube cam lock 390.

Figure 38:
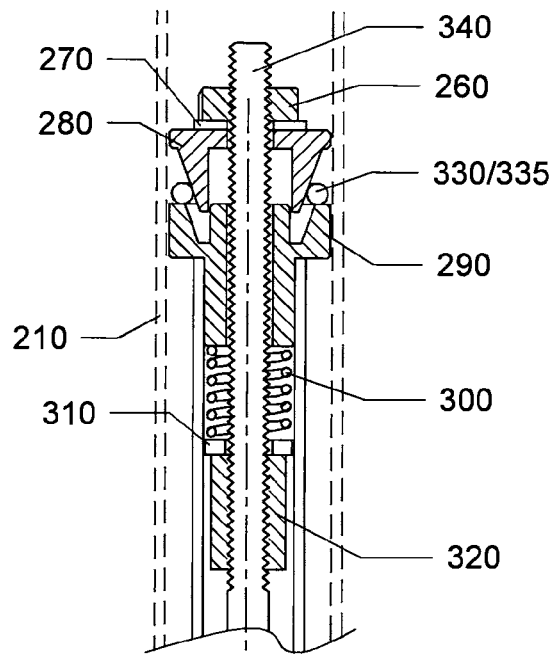
FIG. 38 is an enlarged cross-sectional view of the FIG. 27 tube lock assembly along arrows 38X.

FIG. 38 is an enlarged cross-sectional view of the FIG. 27 tube lock assembly 250 along arrows 38X. Space can be seen between the O-ring and the inside wall of the top tube indicating that the tubes are not locked together.

Figure 39:
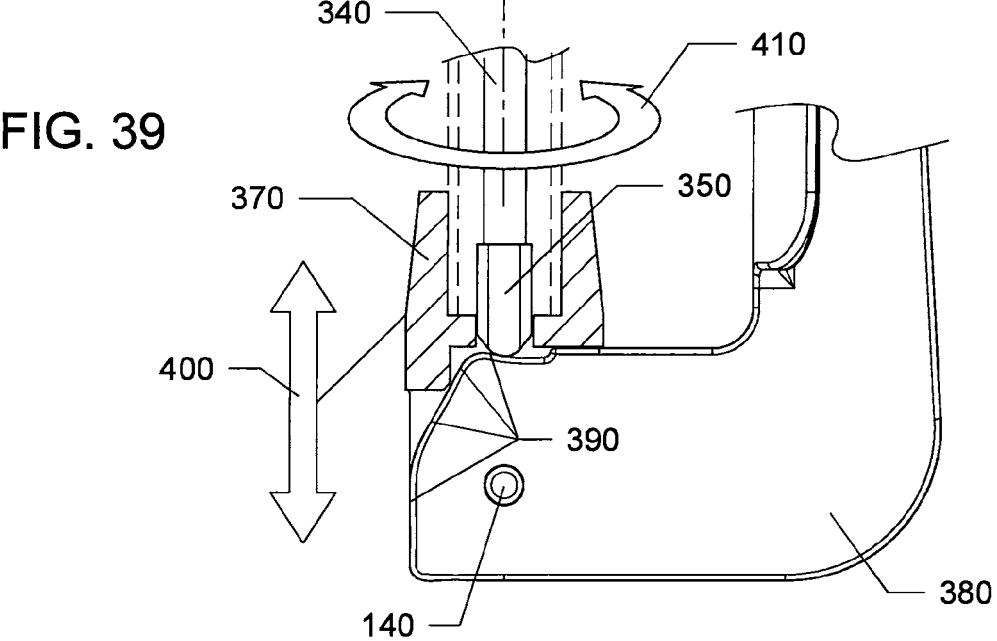
FIG. 39 is an enlarged detailed view of the cam follower and tube cam lock from FIG. 37.

FIG. 39 is an enlarged detailed view of the cam follower 350 and tube cam lock 390 from FIG. 37.

Referring to FIGS. 36-39 uncompressed O-ring 330 is not jammed against inner wall of upper tube 210 and the bottom edges of tube lock O-ring 280 is raised out of the circumferential cavity in the upper surface of tube lock fixed flange 290. This allows for bottom tube 220 to move up and down relative to top tube 210 to adjust the overall telescoping length of top tube 210 and bottom tube 220. Once the user finds a selected length, the chin rest 380 is rotated downward along arrow 420 (shown in FIG. 45).

Figure 40:
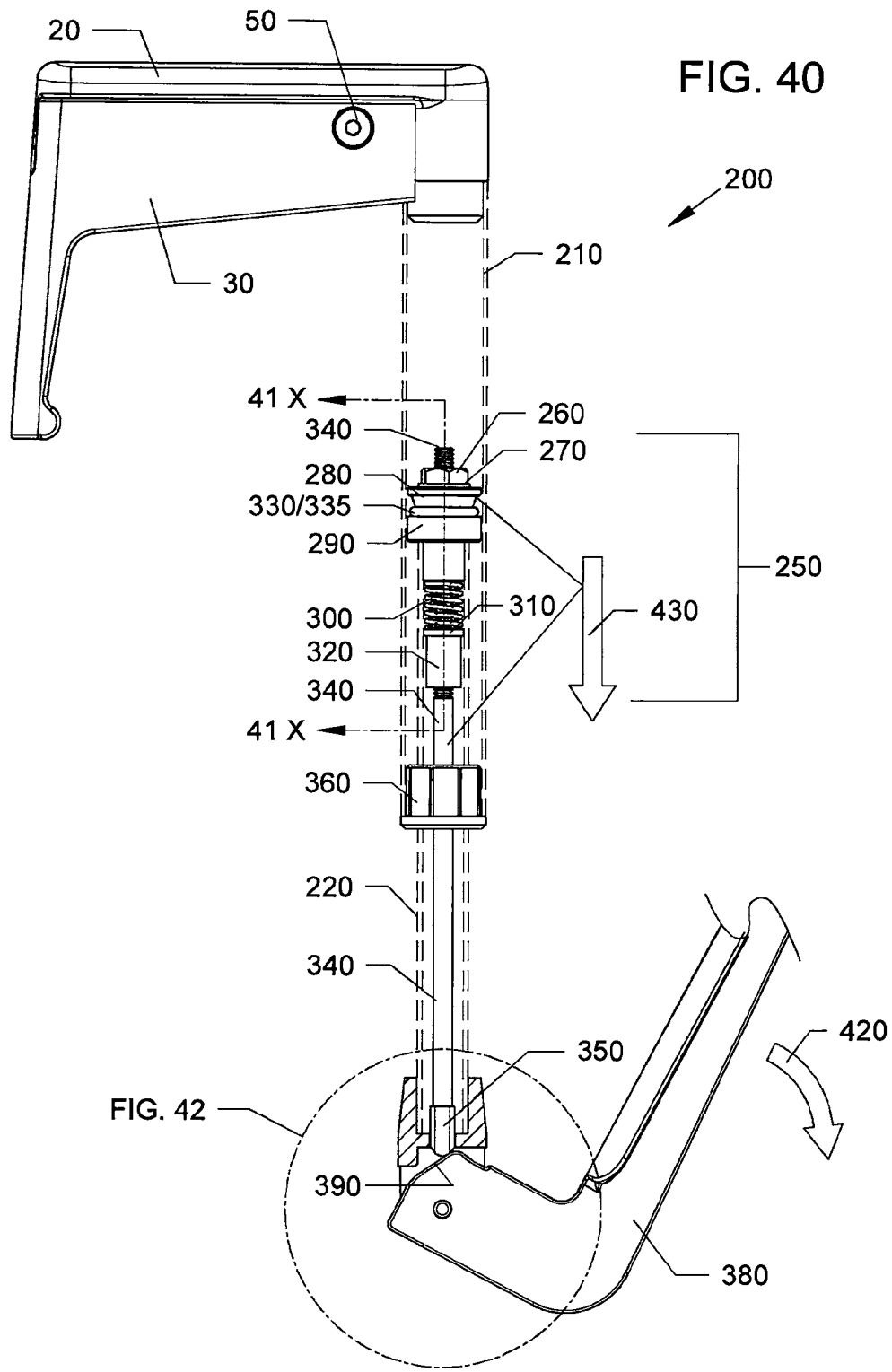
FIG. 40 is another side view of the head rest of FIG. 37 with the chin rest starting to fold down (motion arrow).

FIG. 40 is another side view of the head rest 200 of FIG. 37 with the chin rest 380 starting to fold down along motion arrow 420. The cam follower 350 is riding on the tube lock cam 390 (part of the chin rest) which allows the attached shaft 340 to drop under pressure from the spring. 300. As the shaft 340 drops in the direction of arrow 430, it pulls down the expander flange 280 which begins to expand the O-ring 330. The tubes 210, 220 are not locked together in this configuration. The arrow 430 shows the linear motion of the tube lock shaft 340 pulling expander flange 280 down as a result of the tube lock cam 390 rotation along arrow 420. The expander flange 280 stretches the O-ring 330 outward 330/335 and jam it between the inside wall of the top tube 210 and the fixed flange 290. This locks the tubes 210, 220 together when the chin rest 380 is completely folded down.

As shown in FIG. 40, a tube lock adjustment nut 260 rotated about exterior threads of tube lock shaft 340 fixes the location of tube lock adjustment washer 270 and tube lock O-ring expander flange 280. Tube lock fixed flange 290 can have a lower end with shoulder portions that rest on tube lock spring 300 which presses against tube lock spring washer 310 and spring adjustment washer 320

FIG. 41 is an enlarged detailed section view of tube lock assembly 250 of FIG. 40 along arrows 41X. The expander flange 280 can be seen dropping causing the O-ring 330/335 to expand outward toward the inside wall of the upper tube 210. No space can be seen between the O-ring 330/335 and the inside wall of the upper tube 210.

FIG. 42 is an enlarged detailed view of the tube lock cam 390 and cam follower 350 from FIG. 40.

FIG. 43 is another side view of the headrest 200 of FIG. 37 with the chin rest 380 fully folded down along arrow 420. The cam follower 350 has dropped to the cams low point on tube cam lock 390 allowing the expander flange 280 to fully compress the O-ring 335 between the fixed flange 290 and the inner wall of the upper tube 210. The tubes 210, 220 are locked together in this configuration.

FIG. 44 is an enlarged detailed cross-sectional view of the tube lock assembly 250 of FIG. 43 along arrows 44X. The expander flange 280 can be seen fully compressing the O-ring 335 locking the tubes 210, 220 together. FIG. 45 is an enlarged cross sectional view of the tube cam lock 390 and cam follower 350 of FIG. 43.

Referring to FIGS. 40-45 compressed O-ring 335 is shown as generally jammed against inner wall of upper tube 210 and the bottom edges of tube lock O-ring 280 are generally fit into the circumferential cavity in the upper surface of tube lock fixed flange 290. This allows for bottom tube 220 to be in a locked position relative to top tube 210. In the locked position, the user can rest their chin on the folded down chin rest 380. Once the user is finished the chin rest 380 can be rotated upward in an opposite direction to arrow 420, which allows the bottom tube 220 to move telescoping downward relative to the top tube 210.

FIG. 46 is a top perspective view of another version of the headrest 440 with a sliding metal hook assembly that uses a cam lock lever 480 to set the hook extension position of the hook end (metal hook) 450. This view shows the cam lock lever 480 oriented toward the upper tube 210 indicating that the hook 450 is locked in a length position.

FIG. 47 is another view of the headrest 440 of FIG. 46 showing the cam lock lever 480 oriented away from the upper tube 210 indicating that the hook 480 is unlocked.

FIG. 48 is a cross-sectional view of the hook section of the headrest of FIG. 46 along arrows 48X. The cam locking surface 485 puts pressure on the top of the hook leg 460 locking the hook leg 460 and the metal hook end 450 together and setting the hook extension 450 at a fixed extension.

FIG. 49 is another cross-sectional view of FIG. 47 along arrows 49X showing the cam locking surface 485 out of contact with the top of the hook leg 460 unlocking the assembly. FIG. 50 is an exploded view of the metal hook assembly components of FIG. 46.

Referring to FIGS. 46-50, a final base 530 frictionally fit into the hollow upper end of top tube 210 can have a mount screw 540 screwed into an opening in the right end of hook leg 460 an into the threaded opening in the bottom of hook mount finial 520. A cam stop bracket 500 can be generally fixed to a left end of the hook leg 460 by a cam stop pin 510. A cam lock bracket 470 can be generally fixed to the right end of bent hook end 450 by raised dimple (in the bottom of cam lock bracket that fits into the right hole 455 of the bent hook end 450. A rotatable cam lock lever is pivotally attached to opening(s) in the raised side flanges of the cam lock bracket 470 by a cam lock pin 490.

FIG. 51 is a front perspective view of another version of the headrest 440 with an adjustable, rotating chin rest 550.

FIG. 52 is a rear perspective view of headrest 440 of FIG. 51.

Figure 53:
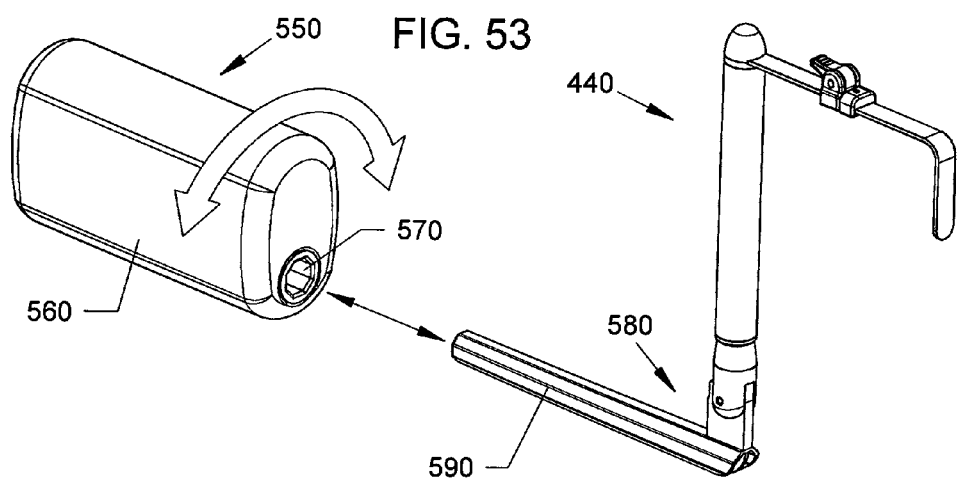
FIG. 53 is a top perspective view of FIG. 51 showing the chin rest, with the plastic hex core molded in, pulled off of the chin rest hex shaft.

FIG. 53 is a top perspective view of FIG. 51 showing the chin rest 550, with the plastic hex core 570 molded in, pulled off of the chin rest hex shaft 590. The hex core 570 and the chin rest hex shaft 590 can have an octagonal shape that locks them together radially but allows for them to be oriented in 45 degree increments to each other. This enables the chin rest cushion 560 to be raised or lowered to meet the needs of taller or shorter users.

Figure 54:
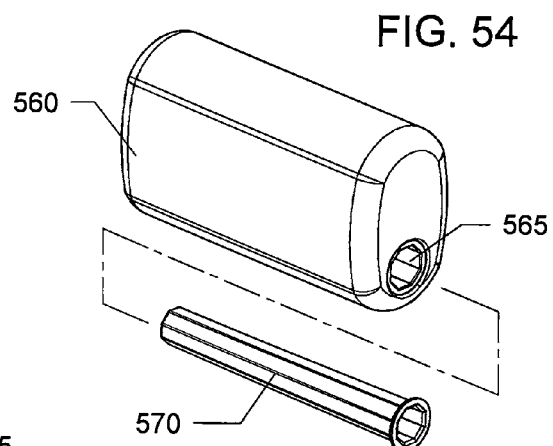
FIG. 54 is a perspective view of the chin rest of FIG. 52 with the hex core removed.

FIG. 54 is a perspective view of the chin rest 550 of FIG. 52 with the hex core 570 removed.

Figure 55:
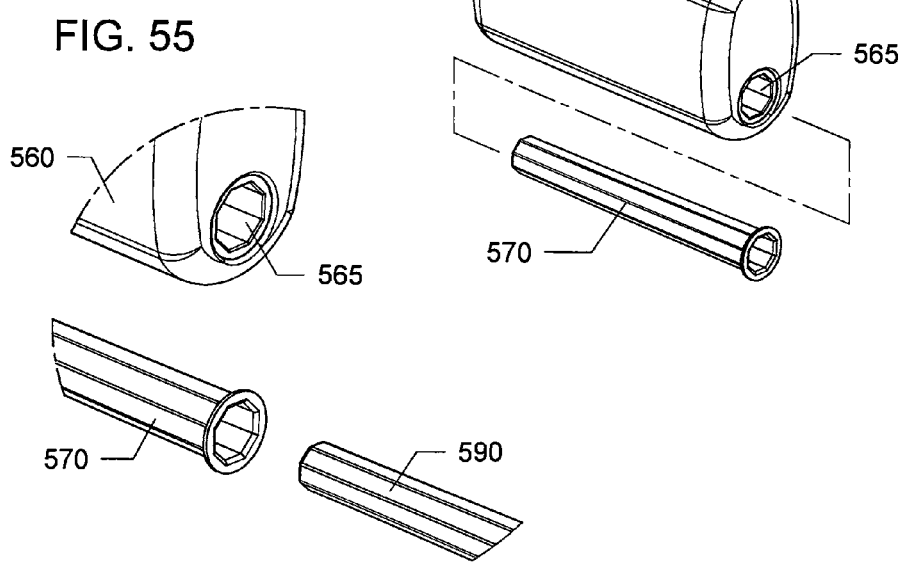
FIG. 55 is an enlarged view of the chin rest cavity (for the hex core), the hex core of FIG. 53, and the end of the chin rest hex shaft.

FIG. 55 is an enlarged view of the chin rest cavity 565 for the hex core 570 of FIG. 53, and the end of the chin rest hex shaft 590.

Figure 56:
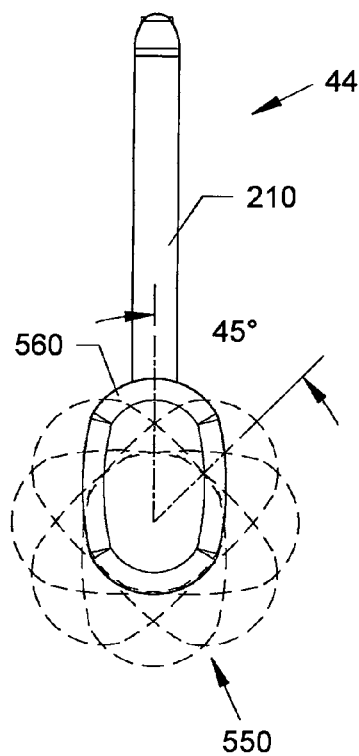
FIG. 56 is an end view of the headrest of the preceding Figures showing the extent of the chin rest cushion adjustment.

FIG. 56 is an end view of the headrest 550 of the preceding Figures showing the extent of the chin rest cushion 560 adjustment.

Figure 57:
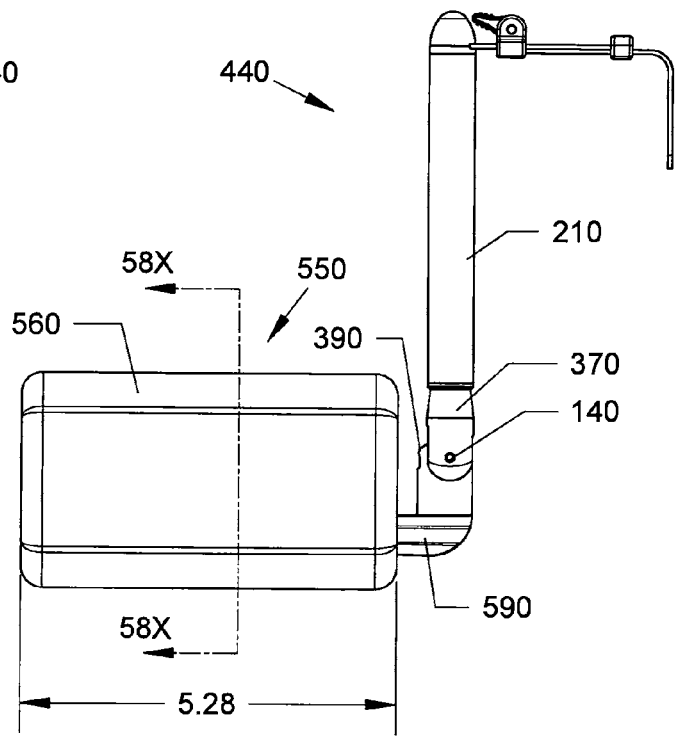
FIG. 57 is a side view of the headrest of FIG. 56.

FIG. 57 is a side view of the headrest 550 of FIG. 56.

Figure 58:
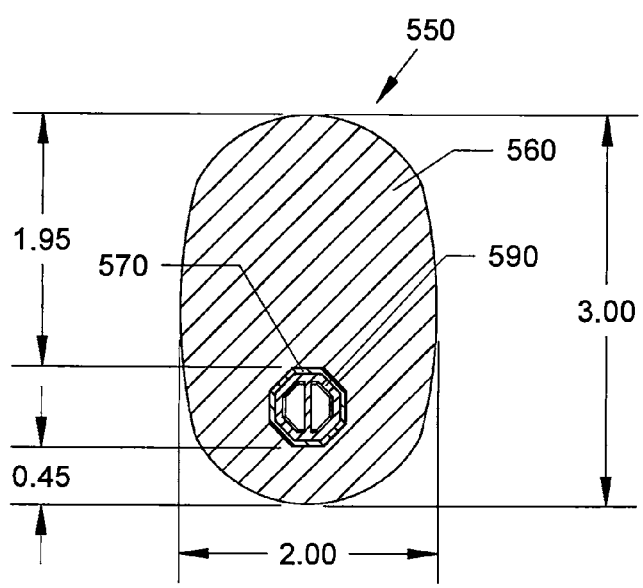
FIG. 58 is a cross sectional view of the chin rest of FIG. 57 along arrows 58X showing the hex shape of the interlocking parts.

FIG. 58 is a cross sectional view of the chin rest of FIG. 57 along arrows 58X showing the hex shape of the interlocking parts.

Referring to FIGS. 51-58, the chin rest 550 can pivot from a folded position adjacent tubes 210, 220 to a perpendicular extended position by rotating relative to chin rest hinge pin 140. The chin rest 550 can rotate in 45 degree increments about chin rest hex shaft 590. The hex core 570 inside the cushion 560 fits over hex shaft 590 and indexes radially 580 to facilitate adjustment of the cushion 560 in approximately 45 degree increments.

FIG. 59 is a top perspective view of the headrest 440 of the preceding Figures with the adjustable chin rest 550. The chin rest 550 is adjusted to its maximum height.

FIG. 60 is another top perspective view of the headrest 440 of FIG. 59 with the chin rest 550 adjusted 45 degrees from its maximum height.

FIG. 61 is another top perspective view of the headrest 440 of FIG. 59 with the chin rest 550 adjusted 90 degrees from its maximum height.

FIG. 62 is another top perspective view of the headrest 440 of FIG. 59 with the chin rest 550 adjusted 135 degrees from its maximum height.

FIG. 63 is another top perspective view of the headrest 440 of FIG. 59 with the chin rest 550 adjusted 180 degrees from its maximum height. This is the chin rests minimum height. Rotational adjustment can be up to approximately 225 degrees, approximately 270 degrees, and approximately 315 degrees.

FIG. 64 is another top perspective view of the headrest 440 of FIG. 63 with the chin rest 550 folded up against tube 210.

Figure 65:
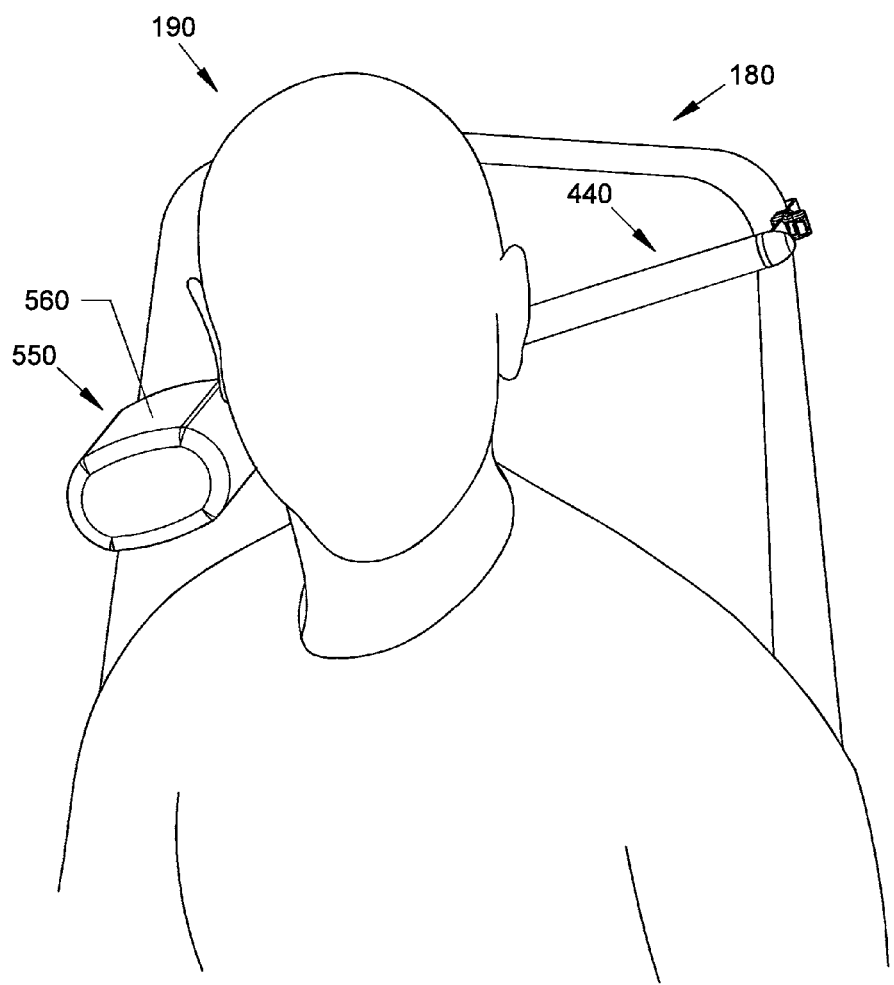
FIG. 65 is a perspective view of the chin rest of the preceding Figures hooked over the side of a seat back with the user resting the side of their head against the cushion.
Figure 66:
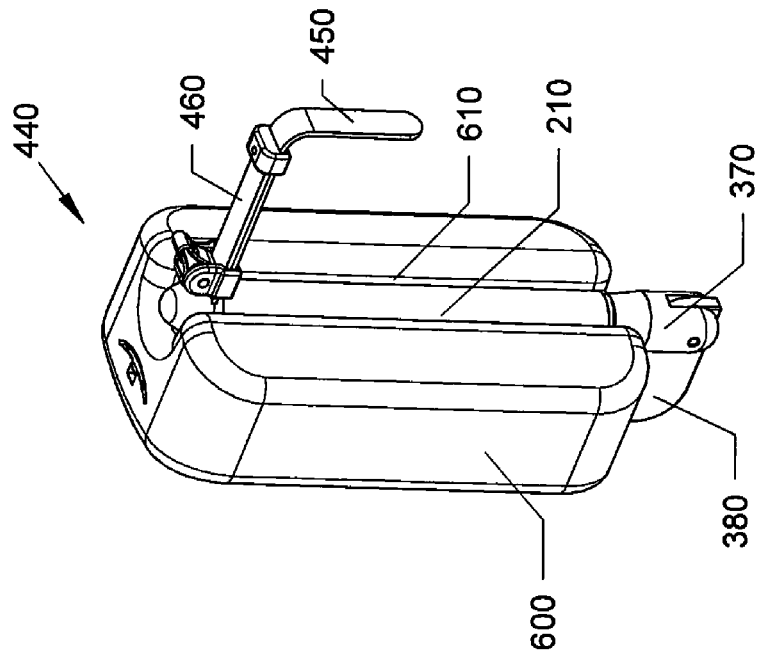
FIG. 66 is a rear perspective view of the chin rest with a slotted chin rest pad. Chin rest shown folded down.

FIG. 65 is a perspective view of the chin rest 440 of the preceding Figures hooked over the side of a seat back 180 with the user 190 resting the side of their head against the chin rest cushion 560. FIG. 66 shows an alternate use to the original configuration of hooking the chin rest 440 over the top of the seat back 180 and resting your chin on the rest as shown in previous Figures.

FIG. 66 is a rear perspective view of the headrest 440 with a chin rest pad 600 and slotted portion 610, with the chin rest 600 shown folded down.

Figure 67:
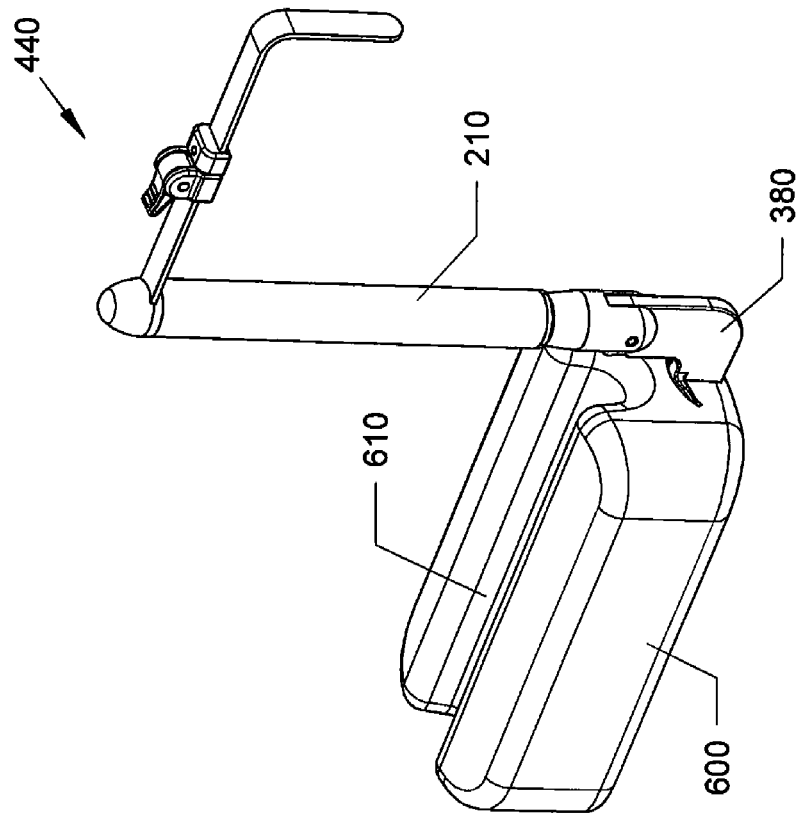
FIG. 67 shows the chin rest pad folded up showing the top tube nesting into the chin rest pad slot.

FIG. 67 shows the chin rest pad 600 folded up with the top tube 210 nesting into the chin rest pad slot 610.

With the pad slot 610, the top tube 210 can rest inside the pad 600 reducing the space needed for storage of the headrest 440. Also, in the configuration shown in FIG. 67, the headrest 440, the hook 450 with hook leg 460 can be wrapped over the top of a seat back so that the user can also rest their head against the rear surface of the chin rest pad 600.

While some embodiments show cushions on the chin rests, the invention can be alternatively used with cushions wrapped about the vertical members, or having separate cushions about the chin rest and about the vertical members.

The invention can be used with a pillow also positioned on the chin rest that has no cushion or includes a cushion.

While a preferred embodiment of the invention uses the novel headrest on airplane passenger seats, the novel headrests can be used on other types of seats, such as but not limited to bus passenger seats, train passenger seats, automobile seats, truck seats, van seats, and the like.

Although some components have been described as being made of metal, the components can be made of different types of materials, such as but not limited to plastic, or vice versa, combinations of metal and plastic, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An adjustable headrest comprising:
a length adjustable clamp for attaching the headrest to a top or side of a seat back;
a vertical member having an upper end attached to the clamp and a lower end; and
a foldable elongated chin support attached to the lower end of the vertical member, and adaptable to be positioned under the chin of a person seated in the seat, the elongated chin support having a first end and a second end with a generally uniform diameter therebetween, the first end of the elongated chin support having a first pivot point attached to the lower end of the vertical member.

2. The adjustable headrest of claim 1, wherein the vertical member has an adjustable length by a first vertical member telescoping with a second vertical member to different lengths.

3. The adjustable headrest of claim 2, wherein the first vertical member and the second vertical member include tubular members.

4. The adjustable headrest of claim 2, wherein the telescopingly adjustable length is adjustable to different lengths when the chin support is a raised folded position parallel to and adjacent to the first and the second vertical member.

5. The adjustable headrest of claim 4, wherein the telescopingly adjustable length is fixed to a selected length when the chin support is folded down to a generally perpendicular direction to the first and the second vertical member.

6. The adjustable headrest of claim 2, wherein the clamp includes an L shaped hook end slidingly adjustable to one end of an elongated member, which has a second end attached to an upper portion of the vertical member.

7. The adjustable headrest of claim 6, further comprising:
a cam lock lever having a first position for locking the L shaped hook end to the one end of the elongated member, and a locking pin having a second position for adjusting a length of the L shaped hook end relative to the elongated member.

8. The adjustable headrest of claim 2, further comprising: a cushion sleeve on the chin support.

9. The adjustable headrest of claim 8, wherein the chin support includes:
a hex shaped shaft, with a cushion hex core fit about the hex shaped shaft, which together fit into a core opening in one end of the cushion sleeve, wherein the cushion sleeve is rotatable to different positions relative to the chin support by radially indexing the cushion sleeve on the hex core relative to the hex shaped shaft.

10. The adjustable headrest of claim 8, further comprising:
a pivot portion between the lower end of the vertical member and the chin support; and
an elongated slot along an upper surface of the cushion sleeve, wherein folding the chin support upward allows for a side of the vertical member to fit within the elongated slot on the cushion sleeve.

11. The adjustable headrest of claim 1, wherein the clamp includes an L shaped hook end slidingly adjustable to one end of an elongated member, which has a second end attached to an upper portion of the vertical member.

12. The adjustable headrest of claim 11, further comprising:
a cam lock lever having a first position for locking the L shaped hook end to the one end of the elongated member, and a locking pin having a second position for adjusting a length of the L shaped hook end relative to the elongated member.

13. The adjustable headrest of claim 11, further comprising: a cushion sleeve on the chin support.

14. The adjustable headrest of claim 13, wherein the chin support includes:
a hex shaped shaft, with a cushion hex core fit about the hex shaped shaft, which together fit into a core opening in one end of the cushion sleeve, wherein the cushion sleeve is rotatable to different positions relative to the chin support by radially indexing the cushion sleeve on the hex core relative to the hex shaped shaft.

15. The adjustable headrest of claim 13, further comprising:
a pivot portion between the lower end of the vertical member and the chin support; and
an elongated slot along an upper surface of the cushion sleeve, wherein folding the chin support upward allows for a side of the vertical member to fit within the elongated slot on the cushion sleeve.

16. An adjustable headrest comprising:

a length adjustable clamp for attaching the headrest to a top or side of a seat back;

a vertical member having an upper end attached to the clamp and a lower end; and a foldable chin support attached to the lower end of the vertical member, and adaptable to be positioned under the chin of a person seated in the seat; and a cushion sleeve on the chin support, wherein the chin support includes a hex shaped shaft, with a cushion hex core fit about the hex shaped shaft, which together fit into a core opening in one end of the cushion sleeve, wherein the cushion sleeve is rotatable to different positions relative to the chin support by radially indexing the cushion sleeve on the hex core relative to the hex shaped shaft.

17. An adjustable headrest comprising:

a length adjustable clamp for attaching the headrest to a top or side of a seat back;

a vertical member having an upper end attached to the clamp and a lower end; and a foldable elongated chin support attached to the lower end of the vertical member, and adaptable to be positioned under the chin of a person seated in the seat;

a cushion sleeve on the chin support;

a pivot portion between the lower end of the vertical member and the chin support; and an elongated slot along an upper surface of the cushion sleeve, wherein folding the chin support upward allows for a side of the vertical member to fit within the elongated slot on the cushion sleeve.

18. A method of supporting part of a head of a seated person with a headrest on a seat back, comprising the steps of:

providing an adjustable length clamp to a headrest support;

providing a foldable elongated chin support having a first end and a second end with a generally uniform diameter therebetween attaching the first end of the foldable chin support by a first pivot point on a lower end of a vertical member to the clamp;

adjusting the adjustable length clamp to fit on the top of the back of the seat;

clamping the clamp on the top of a back of a seat; and unfolding the chin support to a generally perpendicular angle to the vertical member and positioning the chin support either against a head or underneath the chin of a person seating in the seat.

19. A method of supporting part of a head of a seated person with a headrest on a seat back, comprising the steps of:

providing an adjustable length clamp to a headrest support;

attaching a foldable chin support by a vertical member to the clamp;

adjusting the adjustable length clamp to fit on the top of the back of the seat;

clamping the clamp on the top of a back of a seat; and unfolding the chin support to a generally perpendicular angle to the vertical member and providing a rotatable cushion with a hex core;

providing the chin support with a hex shaft;

wrapping the rotatable cushion with the hex core about the hex shaft on the chin support; and rotating the cushion to different positions by radially indexing the cushion sleeve on the hex core relative to the hex shaped shaft.

20. A method of supporting part of a head of a seated person with a headrest on a seat back, comprising the steps of:

providing an adjustable length clamp to a headrest support;

attaching a foldable chin support by a vertical member to the clamp;

adjusting the adjustable length clamp to fit on the top of the back of the seat;

clamping the clamp on the top of a back of a seat; and unfolding the chin support to a generally perpendicular angle to the vertical member and providing a pivot portion between the lower end of the vertical member and the chin support;

providing an elongated slot along an upper surface of the cushion sleeve; and folding the chin support upward allows for the vertical member to fit within the elongated slot on the cushion sleeve.

* * * * *